US012500378B2

(12) United States Patent
Ito

(10) Patent No.: US 12,500,378 B2
(45) Date of Patent: Dec. 16, 2025

(54) PLUG CONNECTOR AND RECEPTACLE CONNECTOR, AND METHOD OF EXTRACTING PLUG CONNECTOR

(71) Applicant: Yamaichi Electronics Co., Ltd., Tokyo (JP)

(72) Inventor: Toshiyasu Ito, Tokyo (JP)

(73) Assignee: YAMAICHI ELECTRONICS CO., LTD., Tokyo (JP)

( * ) Notice: Subject to any disclaimer, the term of this patent is extended or adjusted under 35 U.S.C. 154(b) by 383 days.

(21) Appl. No.: 18/087,999

(22) Filed: Dec. 23, 2022

(65) Prior Publication Data

US 2024/0213715 A1 Jun. 27, 2024

(51) Int. Cl.
*H01R 13/62* (2006.01)
*H01R 13/629* (2006.01)
*H01R 13/633* (2006.01)

(52) U.S. Cl.
CPC ... *H01R 13/62961* (2013.01); *H01R 13/6335* (2013.01)

(58) Field of Classification Search
CPC .......... H01R 13/62961; H01R 13/6335; H01R 13/6275; H01R 13/639; H01R 13/6272; H01R 24/28; H01R 24/76; H01R 43/26
See application file for complete search history.

(56) References Cited

U.S. PATENT DOCUMENTS 4,222,624 A * 9/1980 Eme ........................ H01R 12/51 439/350
5,830,002 A * 11/1998 Ito ....................... H01R 13/6272 439/358
6,592,391 B1 * 7/2003 Wu ..................... H01R 13/6275 439/352
7,226,307 B1 * 6/2007 Chen .................. H01R 13/6275 439/352
7,540,755 B1 6/2009 Wu
(Continued)

FOREIGN PATENT DOCUMENTS

CN 101488621 A 7/2009
CN 105490090 A 4/2016
(Continued)

OTHER PUBLICATIONS

Extended European Search Report issued Apr. 25, 2024 in EP Application No. 23208853.4.
(Continued)

*Primary Examiner* — Truc T Nguyen
(74) *Attorney, Agent, or Firm* — Panitch Schwarze Belisario & Nadel LLP

(57) ABSTRACT

A plug connector inserted in or extracted from a receptacle connector includes a casing and a lever member attached to the casing. The lever member has a fulcrum part supported pivotably to the casing, an engaging part that is located closer to the receptacle connector than the fulcrum part in an insertion-extraction direction and that can engage with an engaged part of the receptacle connector, and an operating part that is located on the opposite side from the receptacle connector with respect to the fulcrum part in the insertion-extraction direction and that, when pressed, can release the engaging part from engagement with the engaged part.

10 Claims, 28 Drawing Sheets

(56) References Cited

U.S. PATENT DOCUMENTS

| | | | | |
|---|---|---|---|---|
| 2002/0031928 | A1* | 3/2002 | Gundermann | H01R 13/62944 439/157 |
| 2003/0194899 | A1* | 10/2003 | Ueda | H01R 13/6272 439/357 |
| 2004/0002255 | A1* | 1/2004 | Ueda | H01R 12/79 439/495 |
| 2010/0130039 | A1* | 5/2010 | Chen | H01R 13/639 439/157 |
| 2011/0294333 | A1* | 12/2011 | Wu | H01R 13/6335 439/345 |
| 2013/0029516 | A1* | 1/2013 | Miyawaki | H01R 13/6272 439/352 |
| 2014/0038447 | A1* | 2/2014 | Brown | H01R 13/62 439/350 |
| 2014/0302694 | A1 | 10/2014 | Qiao et al. | |
| 2015/0162709 | A1* | 6/2015 | Shen | H01R 13/6272 439/352 |
| 2016/0149332 | A1* | 5/2016 | Weber | H01R 13/6335 439/660 |
| 2017/0194741 | A1* | 7/2017 | Zhang | H01R 13/62938 |

FOREIGN PATENT DOCUMENTS

| | | | |
|---|---|---|---|
| CN | 210350278 | U | 4/2020 |
| JP | S58145074 | A | 8/1983 |
| JP | S63186070 | U | 11/1988 |
| JP | H09120864 | A | 5/1997 |
| JP | 2000036360 | A | 2/2000 |
| JP | 2015176643 | A | 10/2015 |

OTHER PUBLICATIONS

Office Action issued on Aug. 6, 2024, in JP Application No. 2023181069.

* cited by examiner

PLUG CONNECTOR AND RECEPTACLE CONNECTOR, AND METHOD OF EXTRACTING PLUG CONNECTOR

BACKGROUND

1. Technical Field

The present invention relates to a plug connector and a receptacle connector and to a method of extracting a plug connector.

2. Description of Related Art

In recent years, signal transmission speeds in telecommunication have been increased. For signal transmission from an optical module to an integrated circuit, the transmission distance is limited to transmit signals through transmission paths (for example, patterns) formed in a substrate without any problem. Thus, it has been attempted to shorten the distance of the transmission paths formed in the substrate as much as possible.

In particular, in a case of high-speed transmission exceeding 200 Gbps, it is further required to shorten the distance of transmission paths formed in a substrate.

To address this, there is a method of directly connecting an optical module and an integrated circuit (in a strict sense, a substrate on which the integrated circuit is mounted) via a cable, so as to transmit signals from the optical module to the integrated circuit without using transmission paths formed in the substrate as much as possible.

In such transmission, the end of a cable is connected to a plug connector, and a receptacle connector is mounted in a substrate region near the integrated circuit. By connecting the plug connector to the receptacle connector, the optical module and the integrated circuit are connected via the cable.

On the upper side of the integrated circuit (while the underside thereof is mounted on the substrate), a heatsink is provided, having a larger external shape than the integrated circuit, and it is thus required to design the receptacle connector to have a thin size that may be contained in a narrow space between the heatsink and the substrate. Further, it is required to mount a large number of receptacle connectors on the substrate and ensure a space for cabling, and it is thus preferable for the receptacle connector to have a smaller size. Also, the plug connector corresponding to the receptacle connector is necessarily designed to have substantially the same size.

Further, the plug connector needs to be inserted or extracted to or from the receptacle connector in or near a narrow space between the heatsink and the substrate, and an operating space is limited in either case. In particular, to extract the plug connector from the receptacle connector, it is also required to unlock a mechanism that locks these connectors to each other, and this makes an operation in a narrow space more difficult.

Patent literature (Chinese Utility Model No. 210350278) discloses a receptacle connector and a plug connector though these connectors are not connectors used in the situation described above.

The mechanism disclosed in the Patent literature is complex, and there is a problem in terms of reliability because a hook part provided in a pull tab is highly likely to be broken due to repeated use or strong tensile force.

An object of the present invention is to provide a plug connector and a receptacle connector and also a method of extracting a plug connector that enable easy extraction of the plug connector secured in the receptacle connector by a reliable mechanism with a simple configuration.

BRIEF SUMMARY

To achieve the above object, a plug connector and a receptacle connector and also a method of extracting a plug connector of the present invention employ the following solutions.

A plug connector according to the first aspect of the present invention is a plug connector inserted in and extracted from a receptacle connector, the plug connector includes: a casing; and a lever member attached to the casing, and the lever member has a fulcrum part supported pivotably relative to the casing, an engaging part located closer to the receptacle connector than the fulcrum part in an insertion-extraction direction and configured to engage with an engaged part of the receptacle connector, and an operating part located on an opposite side from the receptacle connector with respect to the fulcrum part in the insertion-extraction direction and configured to, when pressed, release the engaging part from engagement with the engaged part.

The plug connector according to the present aspect is a plug connector inserted in and extracted from a receptacle connector, the plug connector includes: a casing; and a lever member attached to the casing, the lever member has a fulcrum part supported pivotably relative to the casing, an engaging part that is located closer to the receptacle connector than the fulcrum part in an insertion-extraction direction and that can engage with an engaged part of the receptacle connector, and an operating part that is located on the opposite side from the receptacle connector with respect to the fulcrum part in the insertion-extraction direction and that, when pressed, can release the engaging part from engagement with the engaged part. Therefore, the operating part used for releasing engagement can be located on the opposite side from the receptacle connector with respect to the fulcrum part.

There is not provided, for example, an integrated circuit or a heatsink for cooling the integrated circuit on the opposite side from the receptacle connector with respect to the fulcrum part, and an enough space is available. Thus, the operating part can be pressed in a wide space, and the engaging part can be easily released from engagement with the engaged part. This enables easy extraction of the plug connector that has been secured in the receptacle connector.

Further, since the engaging part, the fulcrum part, and the operating part are provided on a single member (the lever member), a reliable mechanism with a simple configuration can be provided.

For the plug connector according to the second aspect of the present invention, in reference to the first aspect, the operating part is located outside the casing in the insertion-extraction direction.

For the plug connector according to the present aspect, since the operating part is located outside the casing in the insertion-extraction direction, the operating part can be pressed at a position that does not interfere with not only the integrated circuit or the heatsink for cooling the integrated circuit but also the casing.

For the plug connector according to the third aspect of the present invention, in reference to the first aspect or the second aspect, the engaging part is a hole or a recess that fits to a shape of the engaged part formed as a protrusion.

For the plug connector according to the present aspect, since the engaging part is a hole or a recess that fits to the shape of the engaged part formed as a protrusion, the engaging part can be engaged with the engaged part by the simple structure.

For the plug connector according to the fourth aspect of the present invention, in reference to the first aspect or the second aspect, the engaging part is a protrusion that fits to a shape of the engaged part formed as a hole or a recess.

For the plug connector according to the present aspect, since the engaging part is a protrusion that fits to the shape of the engaged part formed as a hole or a recess, the engaging part can be engaged with the engaged part by the simple structure.

For the plug connector according to the fifth aspect of the present invention, in reference to any one of the first aspect to the fourth aspect, the engaging part and the operating part of the lever member are arranged in substantially a same plane.

For the plug connector according to the present aspect, since the engaging part and the operating part of the lever member are arranged in substantially the same plane, a wide space above the lever member can be ensured, and interference of the lever member with a component located above the lever member can be avoided, for example.

A receptacle connector according to the sixth aspect of the present invention is a receptacle connector to which the plug connector according to any one of the first aspect to the fifth aspect is connected, the receptacle connector has a shell, the shell has a recessed part that the lever member enters, and the engaged part is formed in the recessed part.

The receptacle connector according to the present aspect is a receptacle connector to which the plug connector is connected and has a shell, the shell has a recessed part that the lever member enters, the engaged part is formed in the recessed part, and therefore, the shell can be designed so that the lever member enters the recessed part and the lever member does not protrude from the face of the shell even in a state where the engaging part is in engagement with the engaged part. Accordingly, a wide space above the lever member and the shell can be ensured.

For the receptacle connector according to the seventh aspect of the present invention, in reference to the sixth aspect, in a state where the engaging part is in engagement with the engaged part and the lever member is inside the recessed part, the recessed part has a depth dimension such that the lever member is substantially flush with a face of the shell.

For the receptacle connector according to the present aspect, since the recessed part has the depth dimension such that the lever member is substantially flush with the face of the shell in a state where the engaging part is in engagement with the engaged part and the lever member is inside the recessed part, the lever member does not protrude from the face of the shell. Accordingly, a wide space above the lever member and the shell can be ensured.

For the receptacle connector according to the eighth aspect of the present invention, in reference to the sixth aspect or the seventh aspect, the engaged part is a protrusion that fits to the shape of the engaging part formed as a hole or a recess.

For the receptacle connector according to the present aspect, since the engaged part is a protrusion that fits to the shape of the engaging part formed as a hole or a recess, the engaging part can be engaged with the engaged part by the simple structure.

For the receptacle connector according to the ninth aspect of the present invention, in reference to the eighth aspect, the protrusion as the engaged part has a protruding dimension that is substantially equal to or smaller than the depth dimension of the recessed part.

For the receptacle connector according to the present aspect, since the protrusion as the engaged part has a protruding dimension that is substantially equal to or smaller than the depth dimension of the recessed part, this can prevent the protrusion from protruding from the face of the shell.

For the receptacle connector according to the tenth aspect of the present invention, in reference to the sixth aspect or the seventh aspect, the engaged part is a hole or a recess that fits to the shape of the engaging part formed as a protrusion.

For the receptacle connector according to the present aspect, since the engaged part is a hole or a recess that fits to the shape of the engaging part formed as a protrusion, the engaging part can be engaged with the engaged part by the simple structure.

A method of extracting a plug connector according to the eleventh aspect of the present invention is a method of extracting the plug connector according to the first aspect from the receptacle connector, and the method includes: pulling the lever member or a tab attached near the operating part of the lever member while pressing the operating part of the lever member to extract the plug connector from the receptacle connector.

DETAILED DESCRIPTION

A plug connector and a receptacle connector and also a method of extracting a plug connector according to one embodiment of the present disclosure will be described below with reference to the drawings.

[Overview of Communication System]

Figure 1:
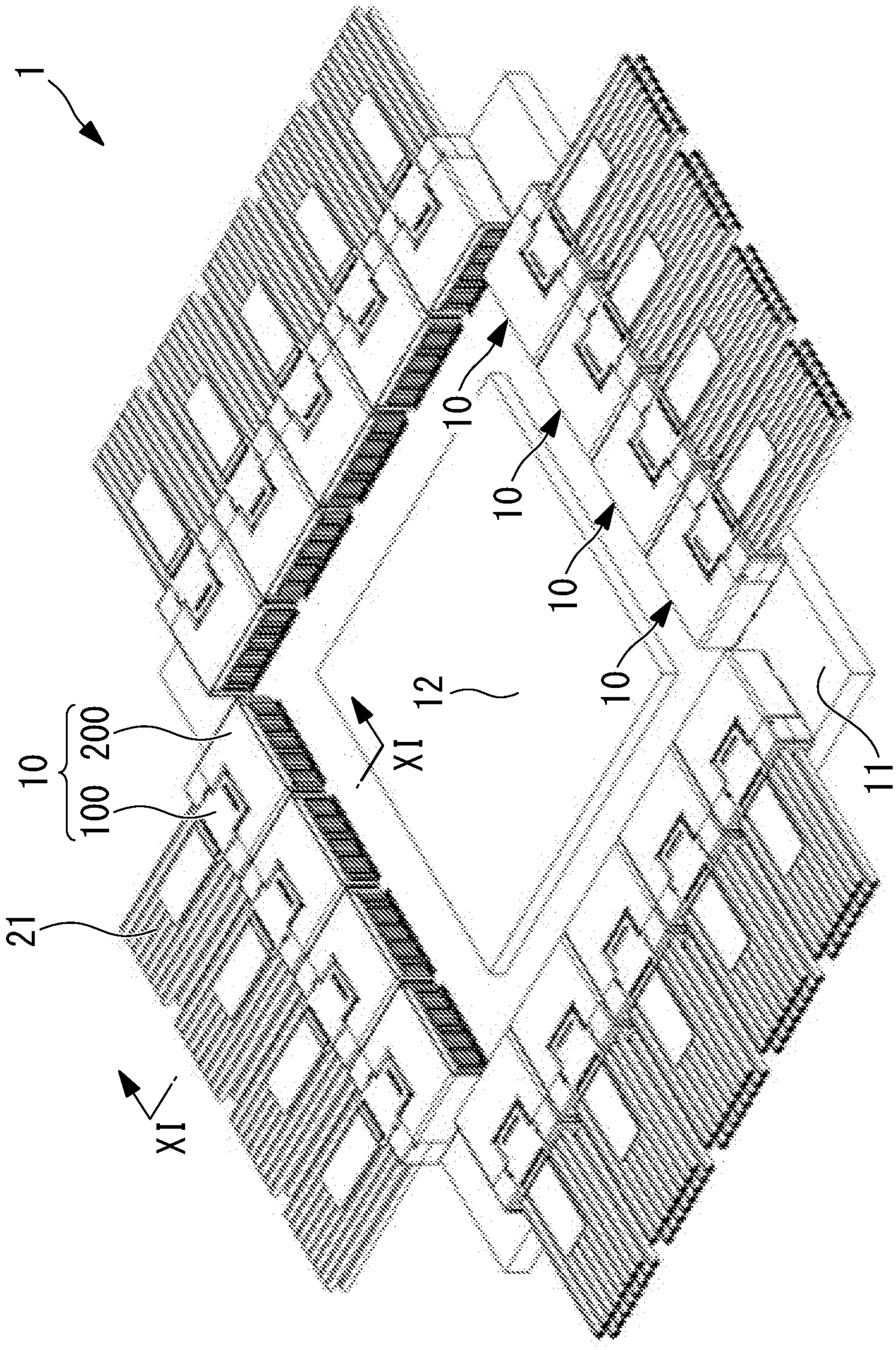
FIG. 1 is a perspective view of a communication system (a heatsink is omitted).
Figure 2:
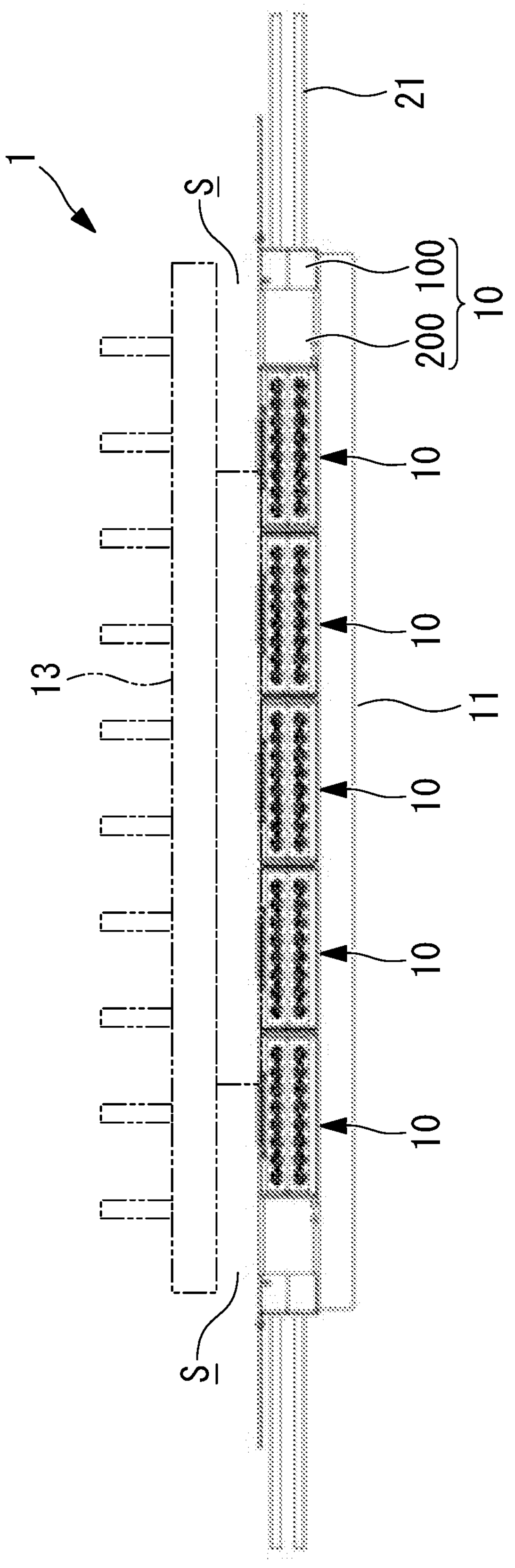
FIG. 2 is a side view of the communication system illustrated in FIG. 1.

As illustrated in FIG. 1 and FIG. 2, a communication system 1 is a system to connect an integrated circuit 12 (for example, ASIC) mounted on a substrate 11 and an optical module (for example, OSFP) (not illustrated) to each other via connector assemblies 10, the connector assemblies 10 each having a plug connector 100 and a receptacle connector 200.

As illustrated in FIG. 1, the integrated circuit 12 is mounted in the center region on the substrate 11.

Further, a plurality of connector assemblies 10 are mounted in a region around the integrated circuit 12 on the substrate 11 so as to surround the integrated circuit 12. In this state, to arrange a large number of connector assemblies 10 on the substrate 11, it is preferable to make the connector assembly 10 as small as possible.

Figure 3:
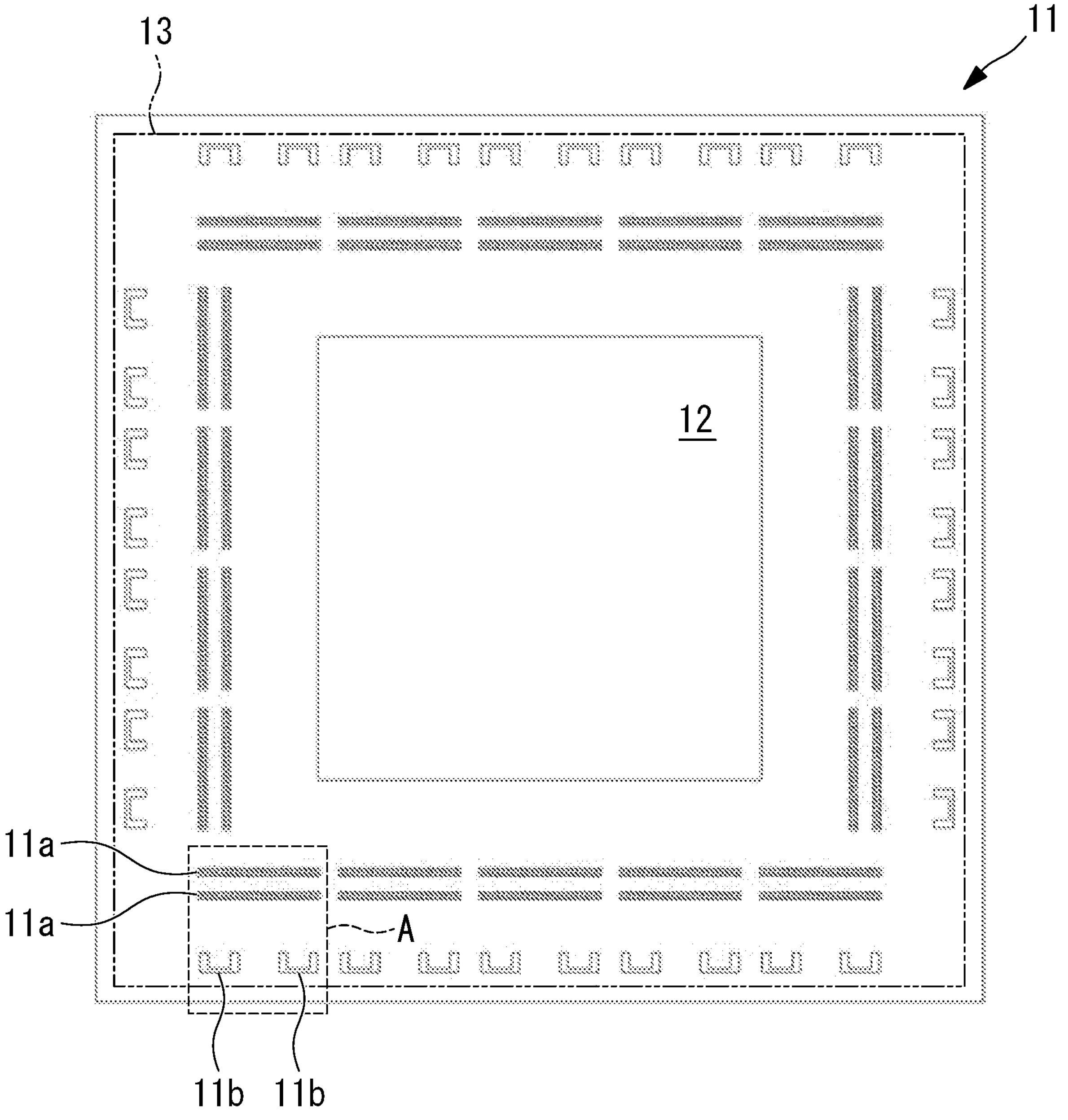
FIG. 3 is a plan view of a substrate (a heatsink is omitted).

As illustrated in FIG. 3, a space for mounting the integrated circuit 12 is provided in the center region on the substrate 11.

Further, electrode pads 11*a* and fixing pads 11*b* for mounting the receptacle connectors 200 of the connector assemblies 10 are formed in a region around the space on the substrate 11. Note that electrode pads 11*a* and fixing pads 11*b* in a region indicated by A of FIG. 3 form one set, which corresponds to one receptacle connector 200.

Each electrode pad 11*a* is of two-line configuration for a single receptacle connector 200 and has a line corresponding to a contact pin group 230 and a line corresponding to a contact pin group 240 described later. A plurality of electrode pads 11*a* are included in each line.

Two fixing pads 11*b* are provided for a single receptacle connector 200 and fit to the shape of fixing tabs 213 of a shell 210 of the receptacle connector 200 described later. In the case of the present embodiment, the fixing pad 11*b* has a U-shape.

As illustrated in FIG. 2, a heatsink 13 is installed on the integrated circuit 12. The heatsink 13 is a component for cooling the integrated circuit 12.

Because the heatsink 13 is installed, a narrow space S is formed between the substrate 11 and the heatsink 13, and the connector assemblies 10 will be installed in the space S. It is thus preferable to make the connector assemblies 10 as thin as possible.

Figure 4:
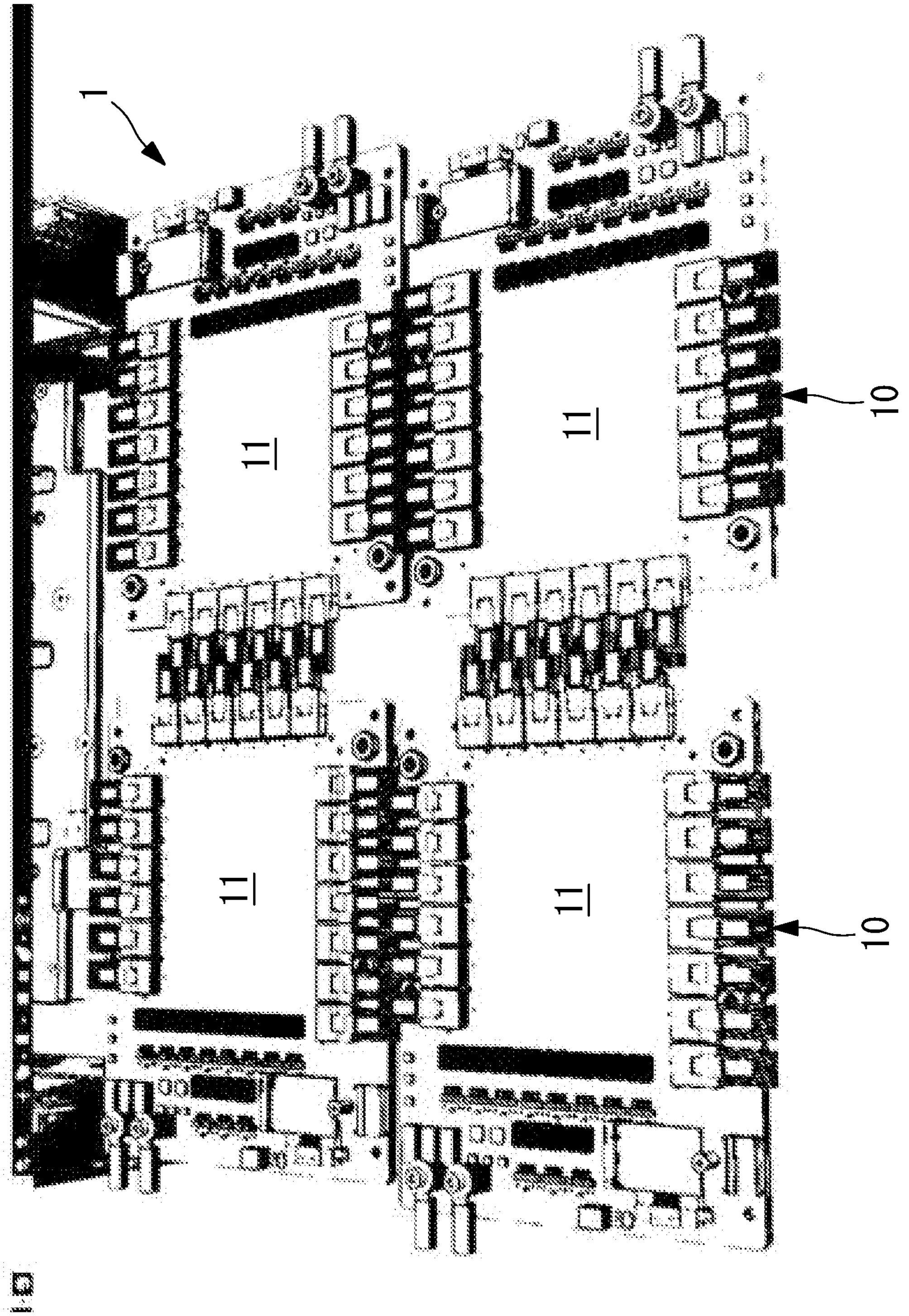
FIG. 4 is a perspective view of a communication system according to one embodiment of the present disclosure.

The communication system 1 configured as described above may be configured such that a plurality of substrates 11 are arranged closely adjacent to each other, as illustrated in FIG. 4. In this state, to ensure a space in which cables 21 are drawn and arranged, it is preferable to make the connector assemblies 10 as small as possible.

[Plug Connector]

Figure 5:
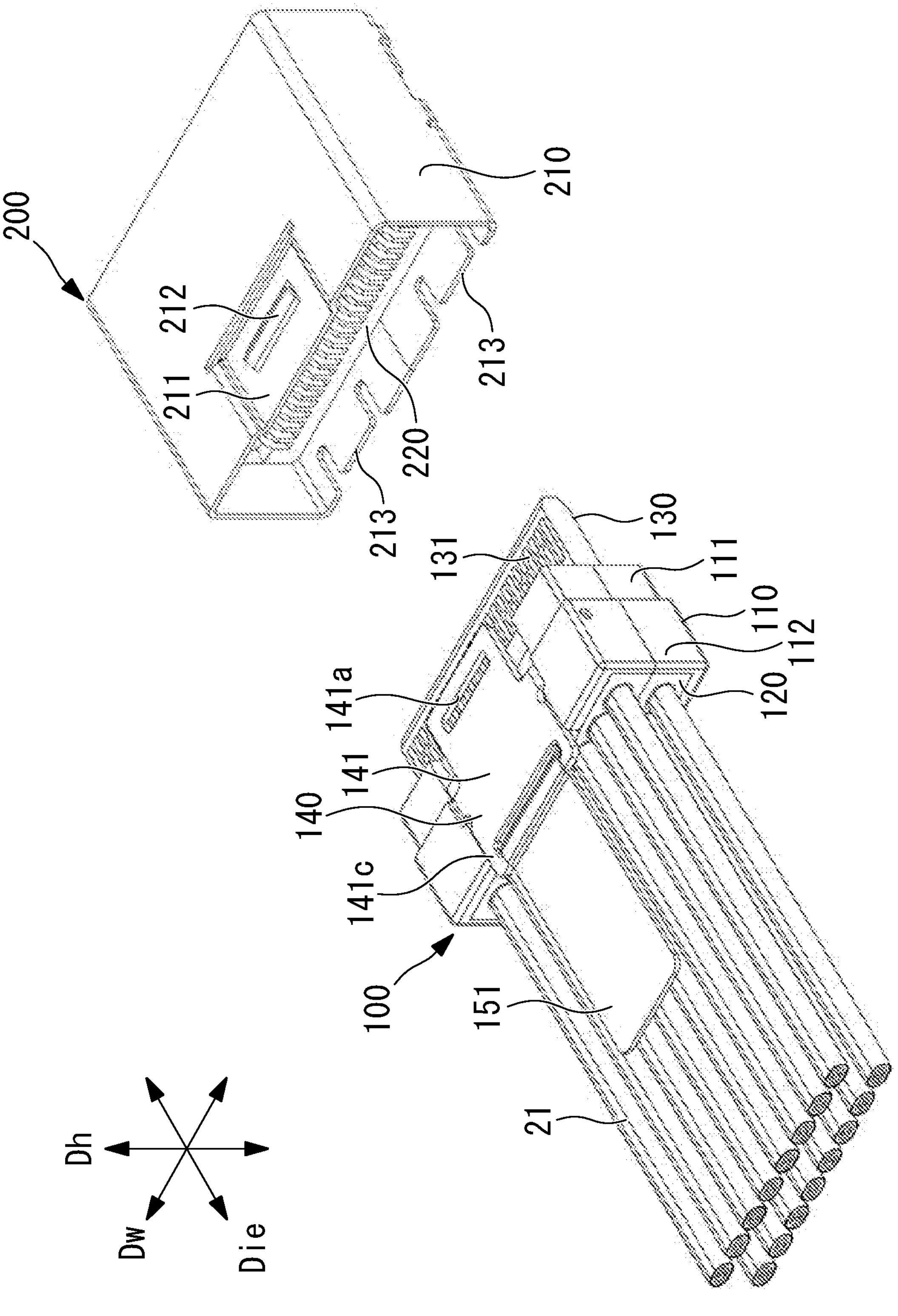
FIG. 5 is a perspective view of a plug connector and a receptacle connector.

As illustrated in FIG. 5, the plug connector 100 is a connector connected to the end of a bundle of multiple cables 21 and inserted in/extracted from the receptacle connector 200 mounted on the substrate 11 (see FIG. 1).

Each cable 21 is a cable in which two internal conductors forming a differential pair are bundled into one cable (such as a Twinax cable), for example.

Figure 6:
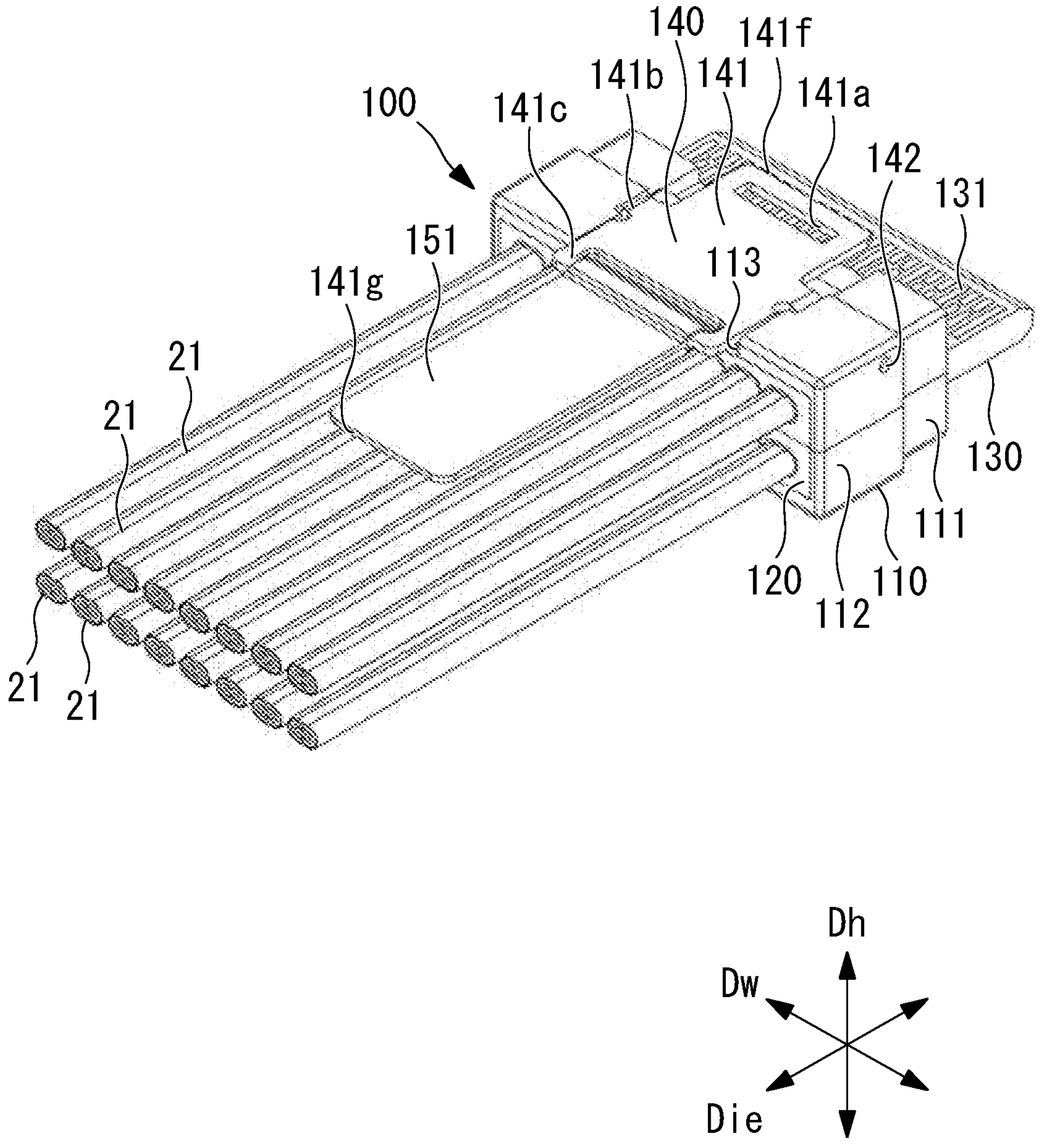
FIG. 6 is a perspective view of the plug connector.
Figure 7:
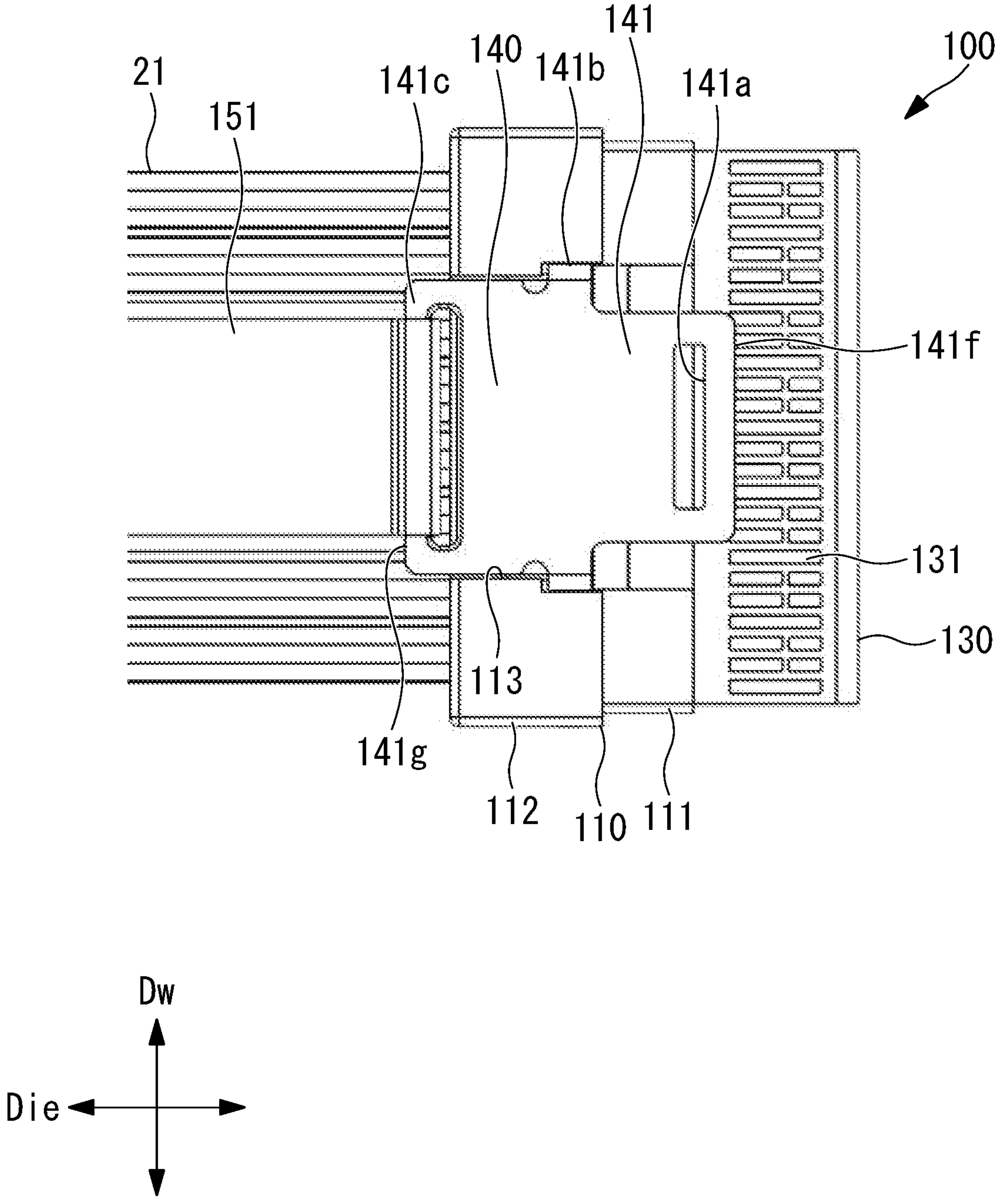
FIG. 7 is a plan view of the plug connector.
Figure 8:
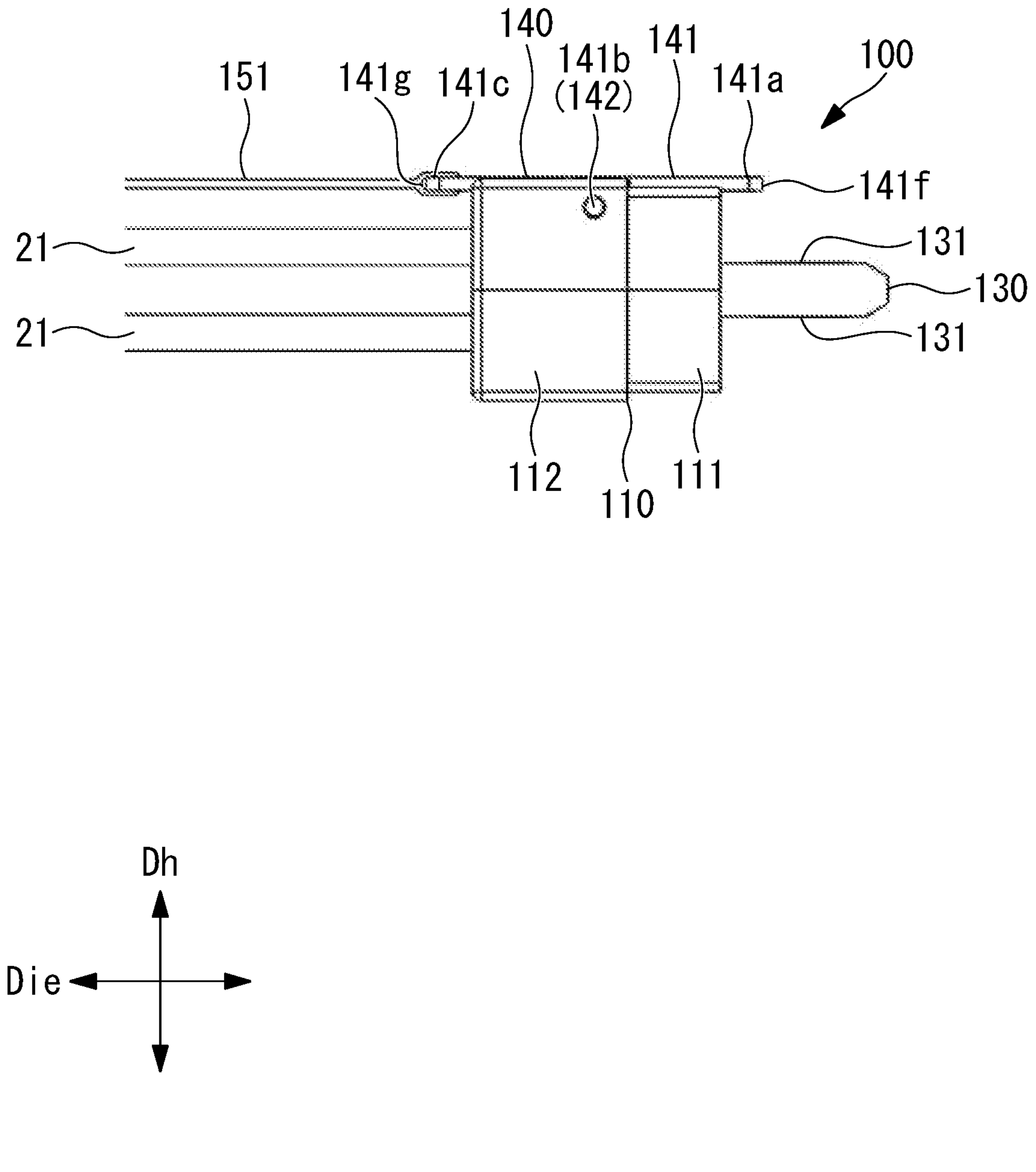
FIG. 8 is a side view of the plug connector.

As illustrated in FIG. 6 to FIG. 8, the plug connector 100 has a casing 110, a locator 120 holding the cables 21, a plug substrate 130 connected to the cables 21, and a lock mechanism 140.

The casing 110 is a component that accommodates and holds the locator 120 and the plug substrate 130 therein. The casing 110 is formed of an insulating material.

The casing 110 has a stepped shape in the insertion-extraction direction Die of the plug connector 100, and a tip-side portion 111 is smaller (thinner) than a base portion 112.

Figure 9:
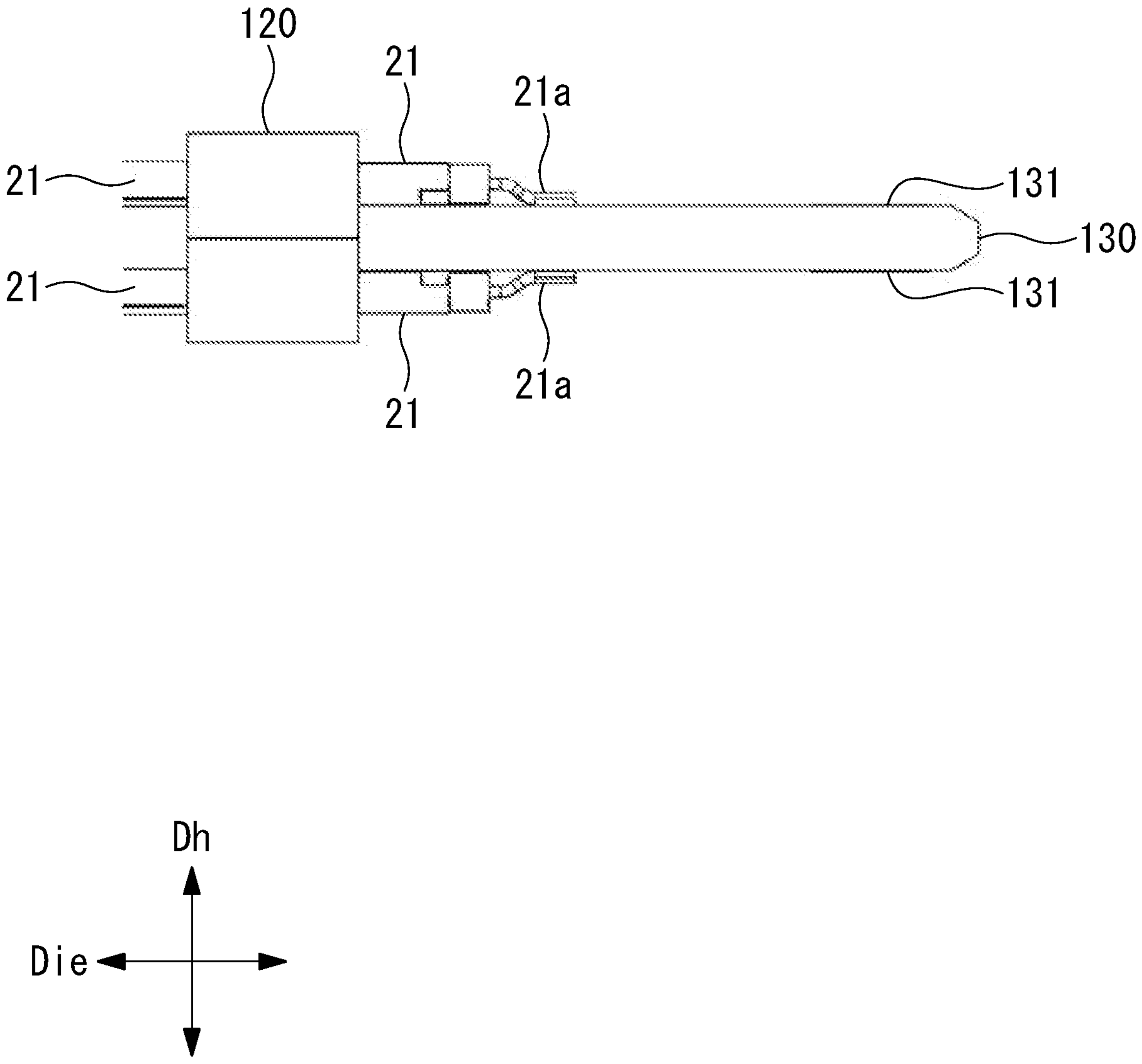
FIG. 9 is a side view of a locator, a plug substrate, and a cable.
Figure 10:
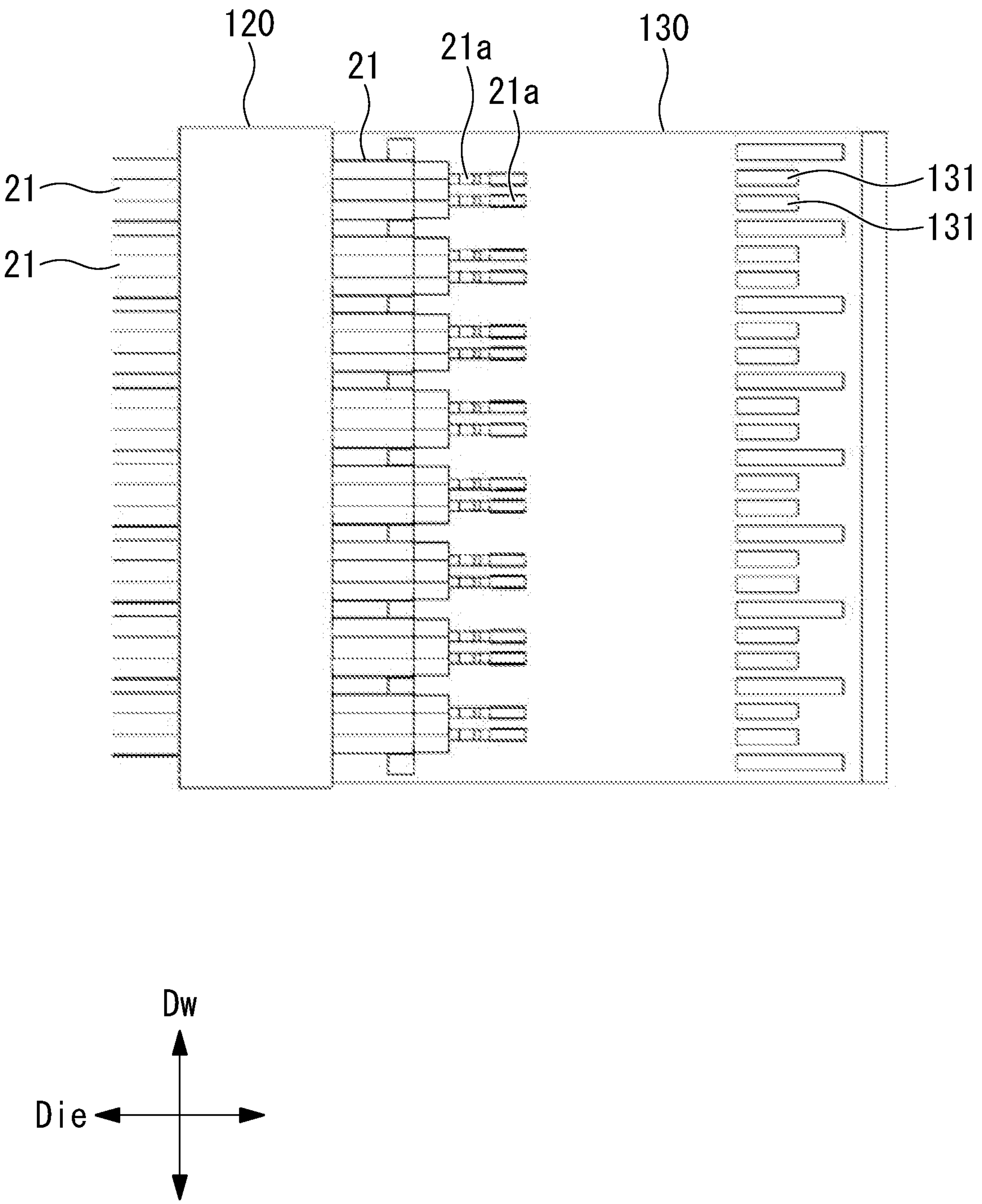
FIG. 10 is a plan view of the locator, the plug substrate, and the cable.

As illustrated in FIG. 9 and FIG. 10, the locator 120 is a component that holds a plurality of cables 21 together. The locator 120 is formed of an insulating material.

As illustrated in FIG. 9, the plurality of cables 21 held by the locator 120 are of two-level configuration. In the case of FIG. 9 and FIG. 10, each level includes eight cables 21. However, the number of cables above is a mere example.

A terminal 21*a* connected to an internal conductor of the cable 21 extends from the tip of each cable 21 held by the locator 120, and each terminal 21*a* is mounted on the base end of the plug substrate 130.

In detail, the terminal 21*a* of each cable 21 on the first level is mounted on a first face of the plug substrate 130, and the terminal 21*a* of each cable 21 on the second level is mounted on a second face (a backside of the first face) of the plug substrate 130.

Each terminal 21*a* is connected to a corresponding electrode pad 131 via a transmission path (for example, a pattern) (not illustrated) formed in the plug substrate 130.

In detail, each terminal 21*a* mounted on the first face of the plug substrate 130 is connected via the transmission path to a corresponding electrode pad 131 provided on the first face of the plug substrate 130. Further, each terminal 21*a* mounted on the second face of the plug substrate 130 is connected via the transmission path to a corresponding electrode pad 131 provided on the second face of the plug substrate 130.

Note that, in addition to the electrode pads 131, a pad for a reference potential is also provided on the plug substrate 130.

The plug substrate 130 is a wide, thin substrate extending in a predetermined direction, and is inserted in the receptacle connector 200.

The extending direction of the plug substrate 130 matches the insertion-extraction direction Die of the plug connector 100.

Figure 11:
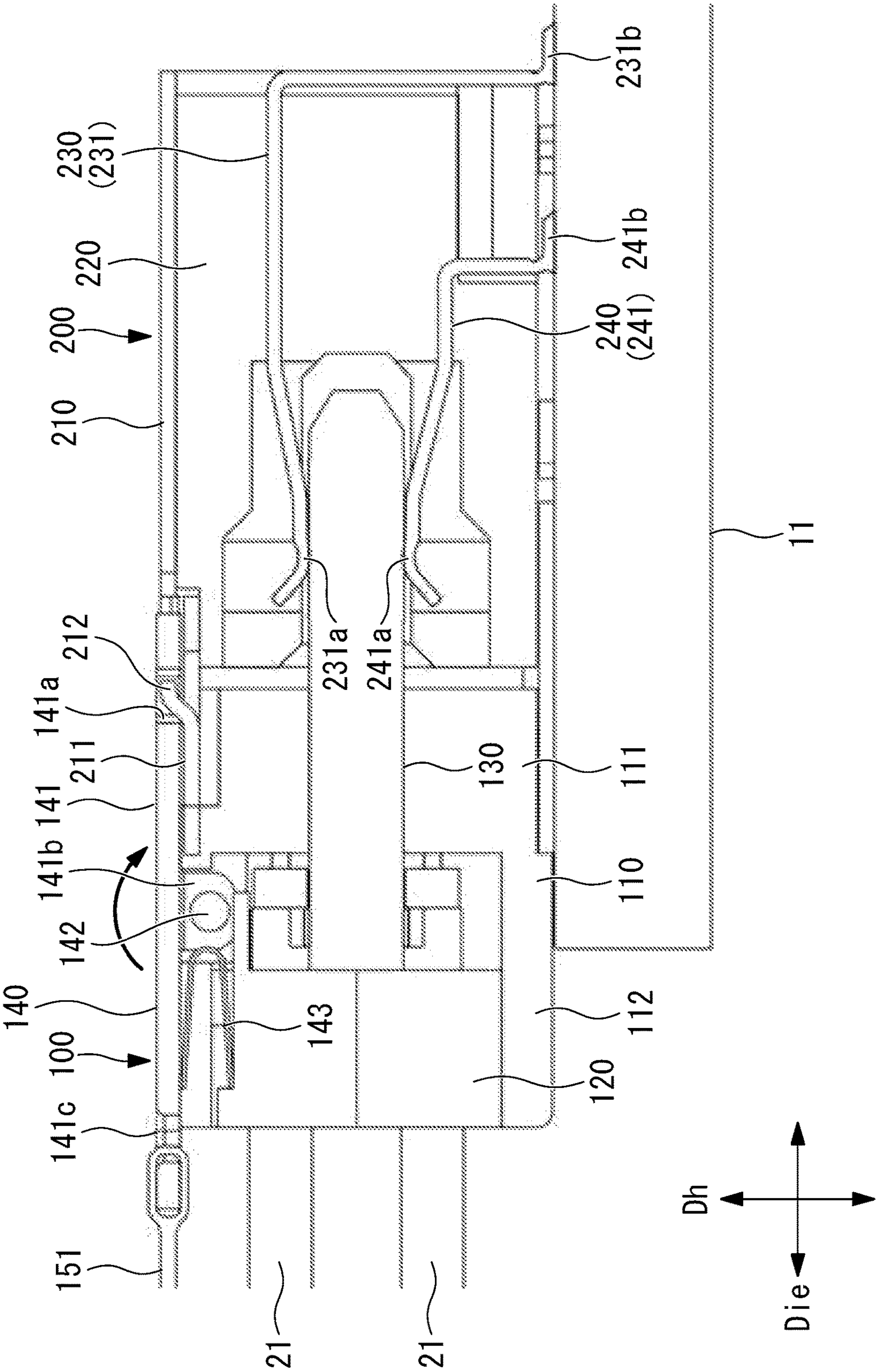
FIG. 11 is a sectional view of a connector assembly taken along a cut line XI-XI illustrated in FIG. 1.

As illustrated in FIG. 6 and FIG. 11, the locator 120 holding the cables 21 is held by the base portion 112 of the casing 110, the plug substrate 130 connected to the cables 21 is held by the tip-side portion 111 of the casing 110, and thereby the casing 110, the locator 120, and the plug substrate 130 are integrated as the plug connector 100.

<Configuration of Lock Mechanism>

As illustrated in FIG. 5 to FIG. 8, the plug connector 100 has a lock mechanism 140.

The lock mechanism 140 is a mechanism for locking the plug connector 100 to the receptacle connector 200 when the plug connector 100 is inserted in the receptacle connector 200.

One example of the lock mechanism 140 will be described below.

As illustrated in FIG. 6 and FIG. 11 to FIG. 14, the lock mechanism 140 has a lever member 141, a shaft 142, and a leaf spring 143.

Figure 12:
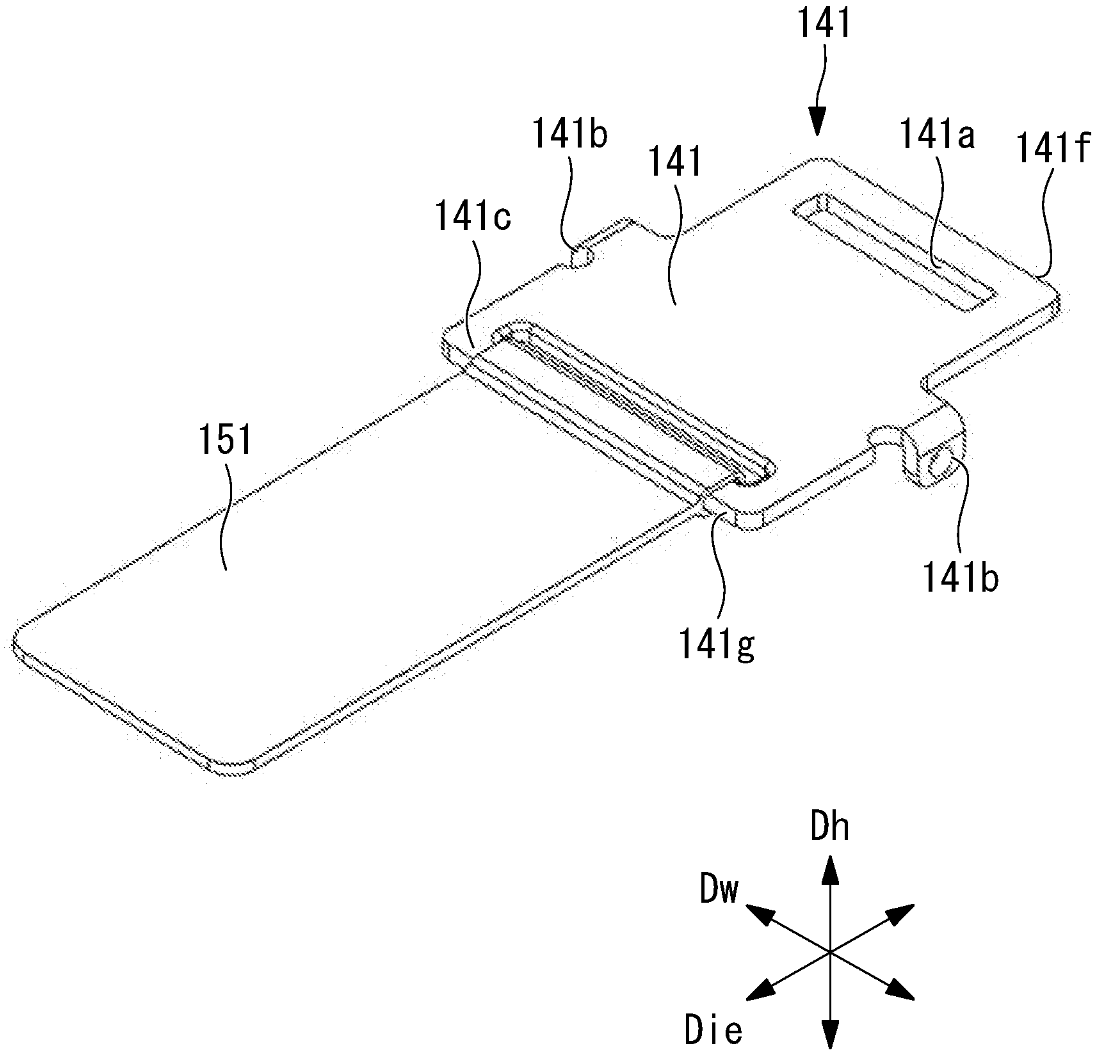
FIG. 12 is a perspective view of a lever member.
Figure 13:
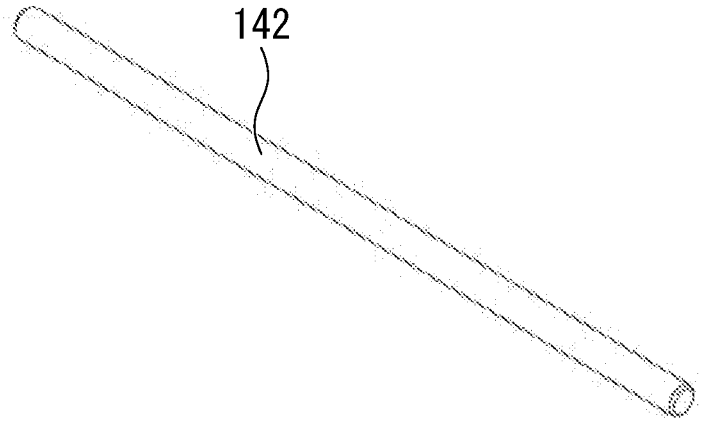
FIG. 13 is a perspective view of a shaft.

As illustrated in FIG. 6 and FIG. 12, the lever member 141 is a component in which an engaging part 141*a*, fulcrum parts 141*b*, and an operating part 141*c* are provided on a single thin plate-like member. The lever member 141 is made of metal, for example.

A cutout 113 is provided in the center region of the upper part of the base portion 112 of the casing 110 (see FIG. 15), and the lever member 141 is arranged in a state where the lever member 141 is accommodated in the cutout 113.

The lever member 141 has a tip 141*f* and a base end 141*g* facing each other in the insertion-extraction direction Die. The tip 141*f* is an edge closer to the receptacle connector 200, and the base end 141*g* is an edge opposite to the tip 141*f*.

The engaging part 141*a* is a portion that engages with an engaged part 212 provided in the receptacle connector 200 described later. The engaging part 141*a* is a hole or a recess provided near the tip 141*f* of the lever member 141, for example, and has a shape that fits to the engaged part 212 provided in the receptacle connector 200 described later. In the case of FIG. 12, the engaging part 141*a* is a rectangular hole. As illustrated in FIG. 7, the engaging part 141*a* is provided at a position overlapping the tip-side portion 111 of the casing 110 or a position outside the tip-side portion 111 of the casing 110 (a position out of the external shape of the casing 110).

As illustrated in FIG. 6 and FIG. 12, the fulcrum part 141*b* is a portion for supporting the lever member 141 pivotably relative to the casing 110 (a portion serving as a fulcrum). The fulcrum part 141*b* is a hole provided in each piece bent downward from both side edges of the lever member 141 at a position between the tip 141*f* and the base end 141*g* of the lever member 141, for example. When the shaft 142 (see FIG. 13 and FIG. 15) fixed to the casing 110 is inserted in both the holes, the lever member 141 is supported pivotably about the shaft 142.

The operating part 141*c* is a portion pressed by the operator. The operating part 141*c* is provided near the base end 141*g* of the lever member 141, for example. As illustrated in FIG. 7, the operating part 141*c* is provided at a position outside the base portion 112 of the casing 110 (a position out of the external shape of the casing 110). The operating part 141*c* is arranged in substantially the same plane as the engaging part 141*a* on the lever member 141.

As illustrated in FIG. 12, a tab 151 may be connected to the operating part 141*c*, and the lever member 141 and thus the casing 110 can be pulled by the tab 151.

The tab 151 is made of a flexible film material, for example.

Figure 14:
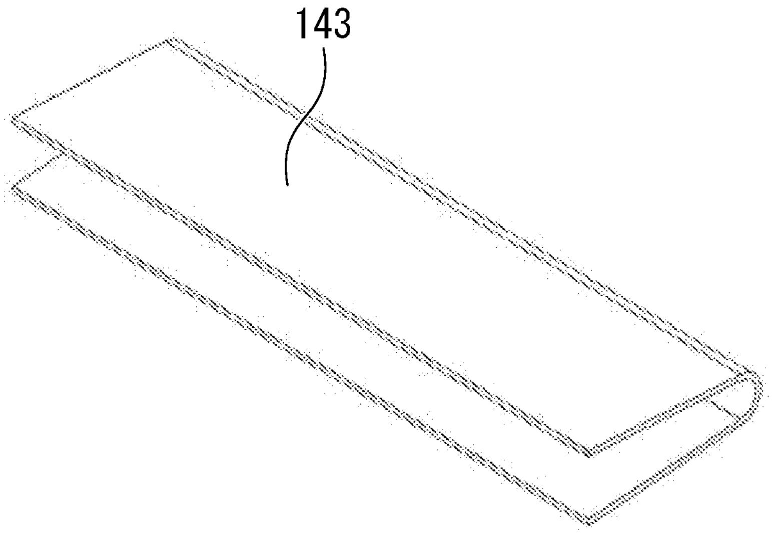
FIG. 14 is a perspective view of a leaf spring.

As illustrated in FIG. 11 and FIG. 14, the leaf spring 143 is a spring having substantially a U-shaped transverse cross section.

Figure 15:
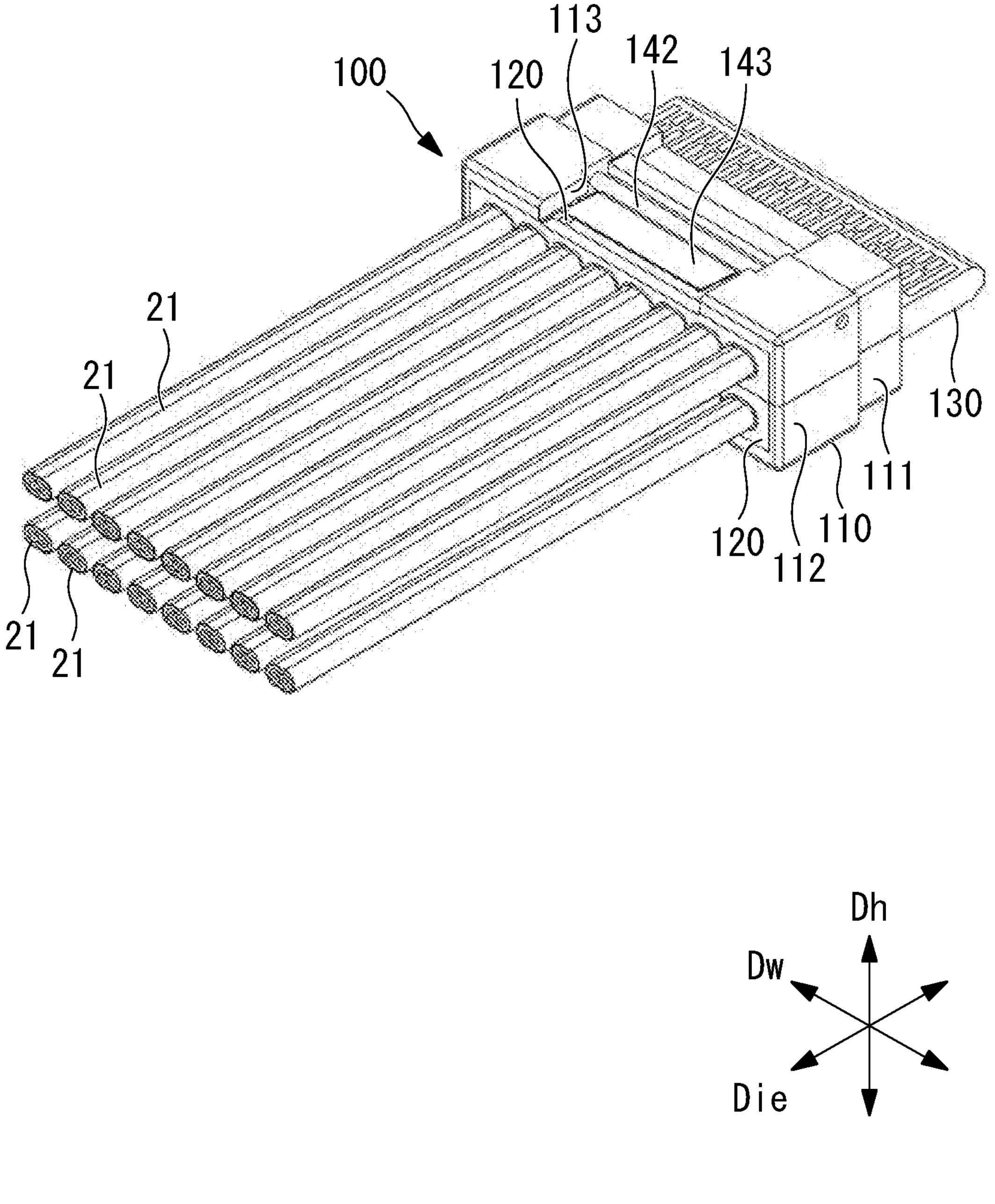
FIG. 15 is a perspective view of a plug connector where the lever member is omitted.

As illustrated in FIG. 11 and FIG. 15, the cutout 113 is provided in the center region of the upper part of the base portion 112 of the casing 110, and a part of the upper face of the locator 120 is exposed. Further, the leaf spring 143 is arranged between the locator 120 and the lever member 141 in a state where the leaf spring 143 is accommodated in the cutout 113.

As illustrated in FIG. 11, one of the pieces of the leaf spring 143 is in contact with the upper face of the locator 120, and the other piece of the leaf spring 143 is in contact with the lever member 141 (in detail, a portion between the fulcrum part 141*b* and the operating part 141*c*). Accordingly, in an unloaded state, the leaf spring 143 elastically pushes the lever member 141 (in detail, a portion between the fulcrum part 141*b* and the operating part 141*c*) in a direction away from the locator 120. Thus, due to the elastic force of the leaf spring 143, the operating part 141*c* is pushed in a direction of being lifted about the fulcrum part 141*b* (about the shaft 142), and the engaging part 141*a* is pushed in a direction of being lowered about the fulcrum part 141*b* (about the shaft 142) (see the clockwise arc arrow indicated in FIG. 11).

The lock mechanism 140 configured as described above is configured as a "lever" where the engaging part 141*a* serves as a point of action, the fulcrum part 141*b* serves as a fulcrum, and the operating part 141*c* serves as a point of effort in the lever member 141, and the point of action, the fulcrum, and the point of effort are aligned in this order from the side on which the receptacle connector 200 is located, as illustrated in FIG. 11.

Thus, as long as at least the fulcrum (the fulcrum part 141*b*) is provided in the casing 110, the point of action (the engaging part 141*a*) and the point of effort (the operating part 141*c*) can be provided at any positions not depending on the shape of the casing 110. This increases flexibility in design and enables flexible design that fits to the shape of the counterpart receptacle connector 200 or the shape of the heatsink 13, for example.

Figure 16:
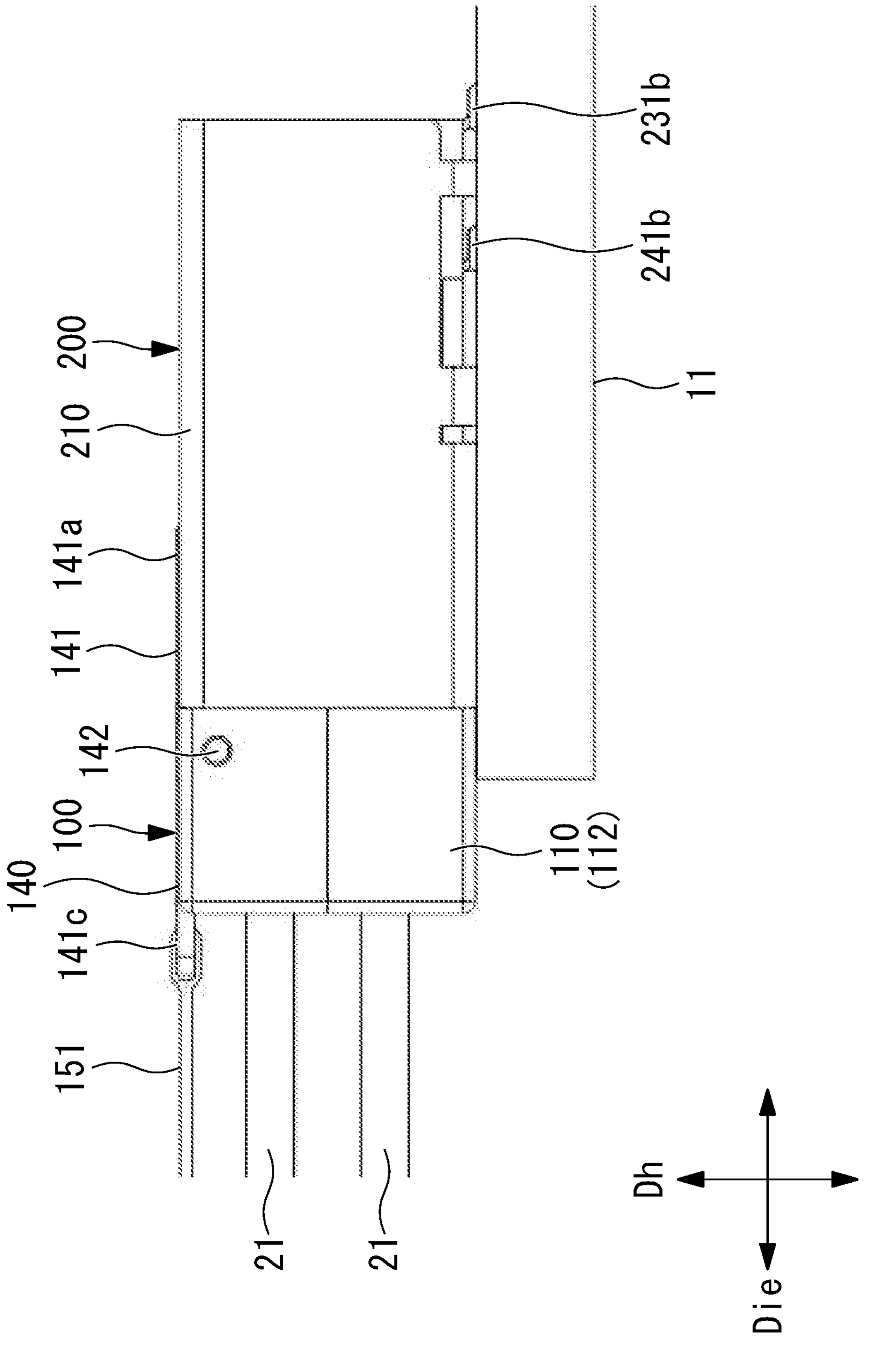
FIG. 16 is a side view of the connector assembly (in an unloaded state).
Figure 17:
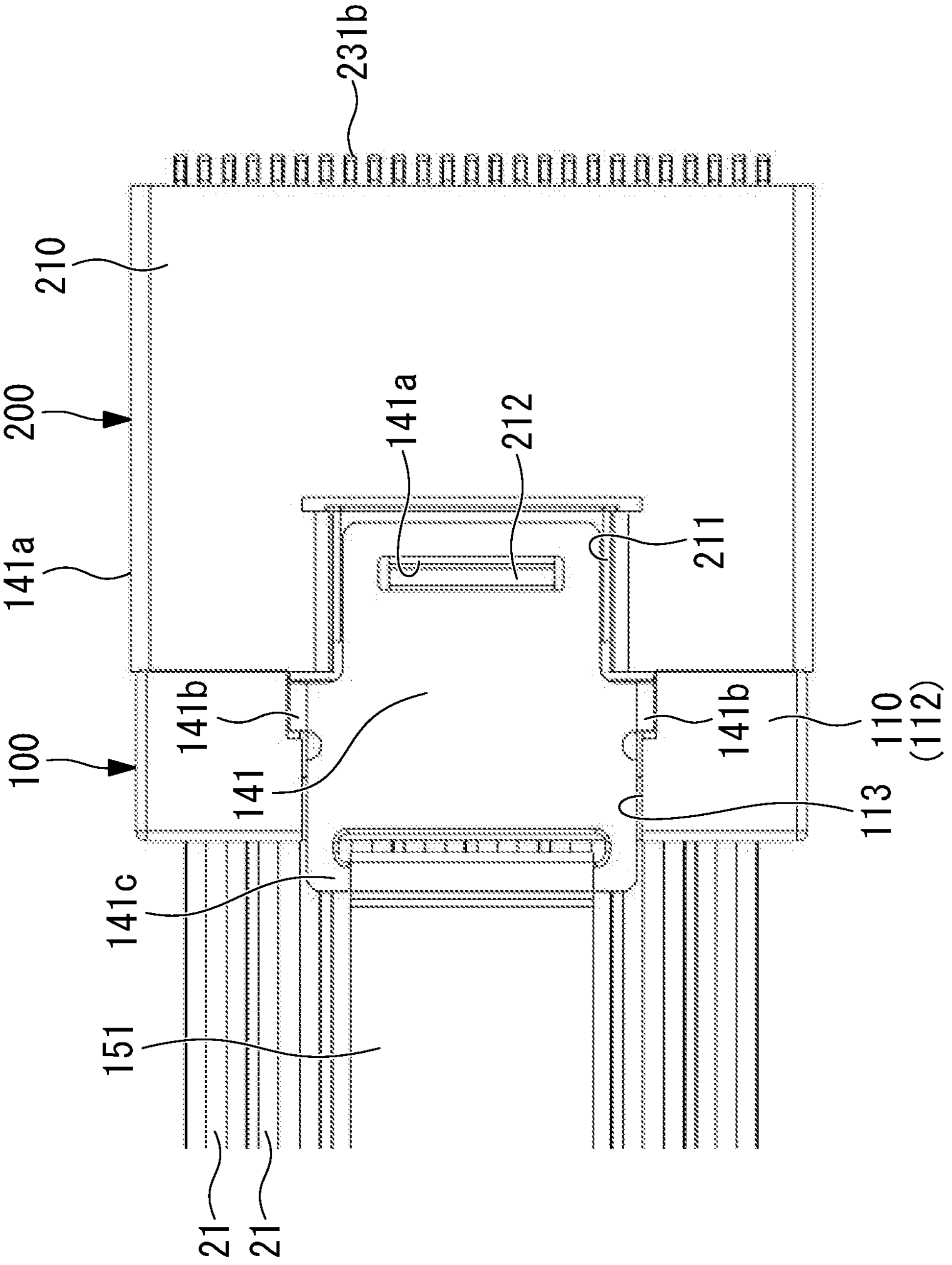
FIG. 17 is a plan view of the connector assembly.

In the lock mechanism 140, as illustrated in FIG. 11, FIG. 16, and FIG. 17, the engaging part 141*a* is lowered by the leaf spring 143 and engaged with (locked with) the engaged part 212 of the receptacle connector 200 in an unloaded state. Thus, the protrusion as the engaged part 212 enters the hole as the engaging part 141*a*. Details of the engaged part 212 will be described later.

Figure 18:
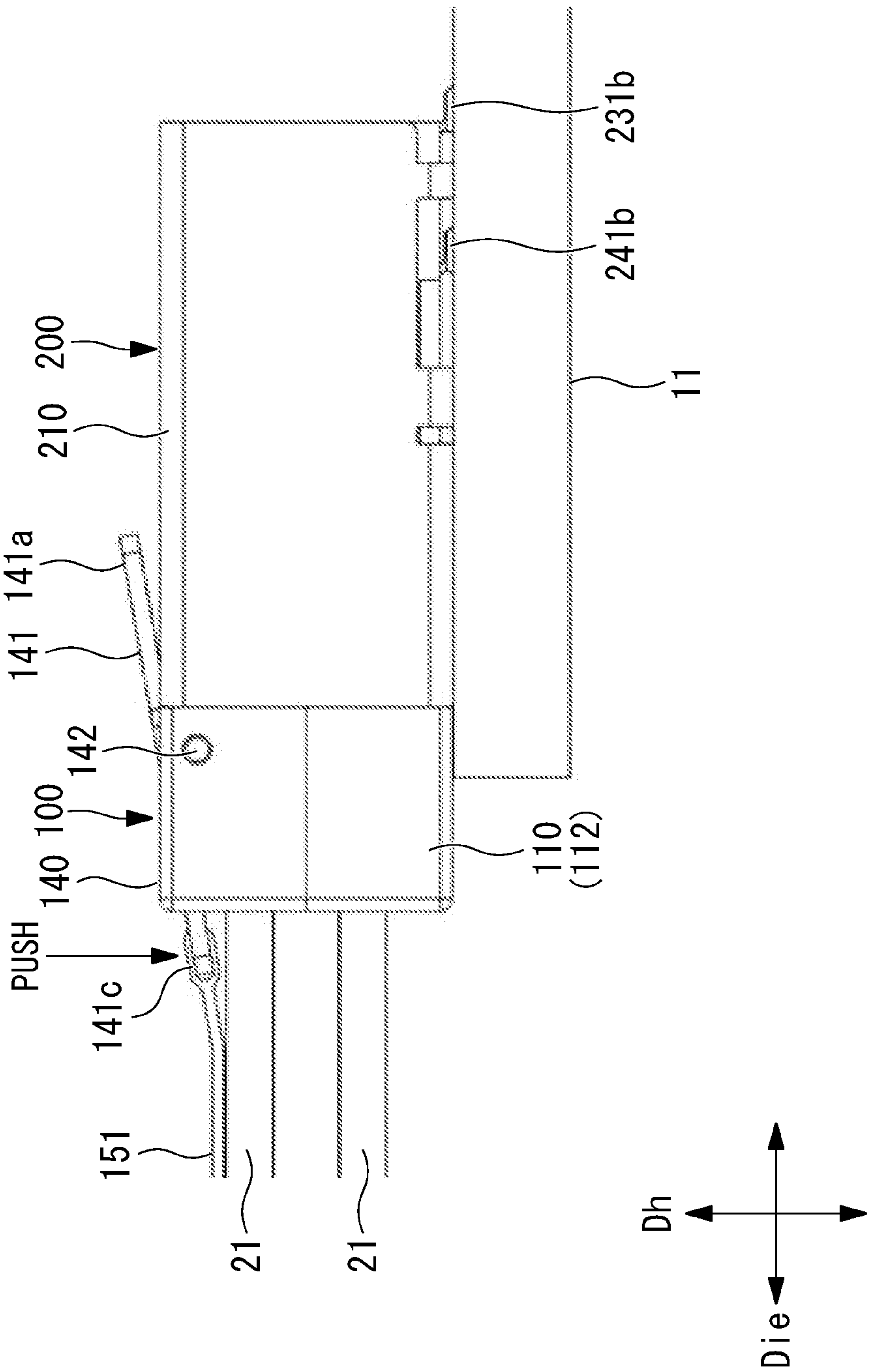
FIG. 18 is a side view of the connector assembly (in a state with an operating part pressed).

Further, as illustrated in FIG. 18, when the operating part 141*c* is pressed, the engaging part 141*a* moves in a direction of being lifted about the fulcrum part 141*b* and is released (unlocked) from engagement with the engaged part 212.

[Receptacle Connector]

As illustrated in FIG. 5, the receptacle connector 200 is a connector that is mounted on the substrate 11 (see FIG. 1) and in/from which the plug connector 100 connected to a bundle of multiple cables 21 is inserted/extracted.

As illustrated in FIG. 19 to FIG. 24, the receptacle connector 200 has a shell 210, a housing 220, a contact pin group 230, and a contact pin group 240.

The shell 210 is a component that accommodates and holds therein the housing 220 holding the contact pin group 230 and the contact pin group 240.

The shell 210 is formed of a conductive material (for example, metal).

The shell 210 has a recessed part 211 and fixing tabs 213.

Figure 22:
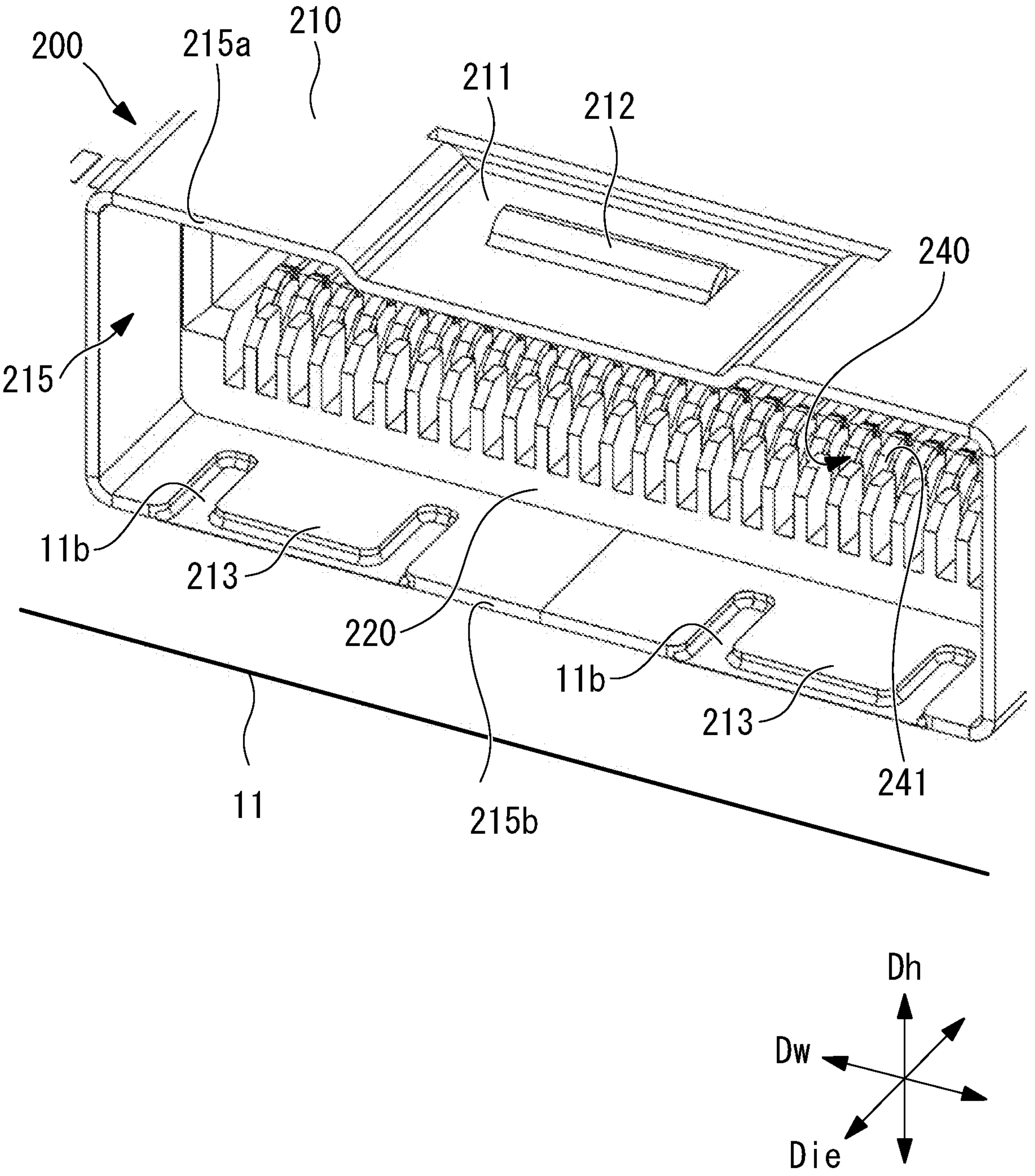
FIG. 22 is a partial enlarged perspective view of the receptacle connector.

As illustrated in FIG. 22, the recessed part 211 is a portion recessed inward from a part of the upper face of the shell 210.

The recessed part 211 includes an upper edge 215*a* forming an opening 215 in which the plug connector 100 is inserted in the insertion-extraction direction Die but does not extend over the whole area (full length) of the shell 210.

As illustrated in FIG. 11 and FIG. 17, the lever member 141 of the plug connector 100 enters the recessed part 211 from above.

As illustrated in FIG. 22, both side walls of the recessed part 211 may be inclined, and thereby the dimension in the width direction Dw of the recessed part 211 may decrease downward. This facilitates the lever member 141 to be guided to the recessed part 211 from above.

For example, the depth dimension of the recessed part 211 is a dimension such that the lever member 141 accommodated in the recessed part 211 is flush with the upper face of the shell 210. Thus, the depth dimension of the recessed part 211 is set to be substantially the same as the thickness dimension of the lever member 141.

Figure 19:
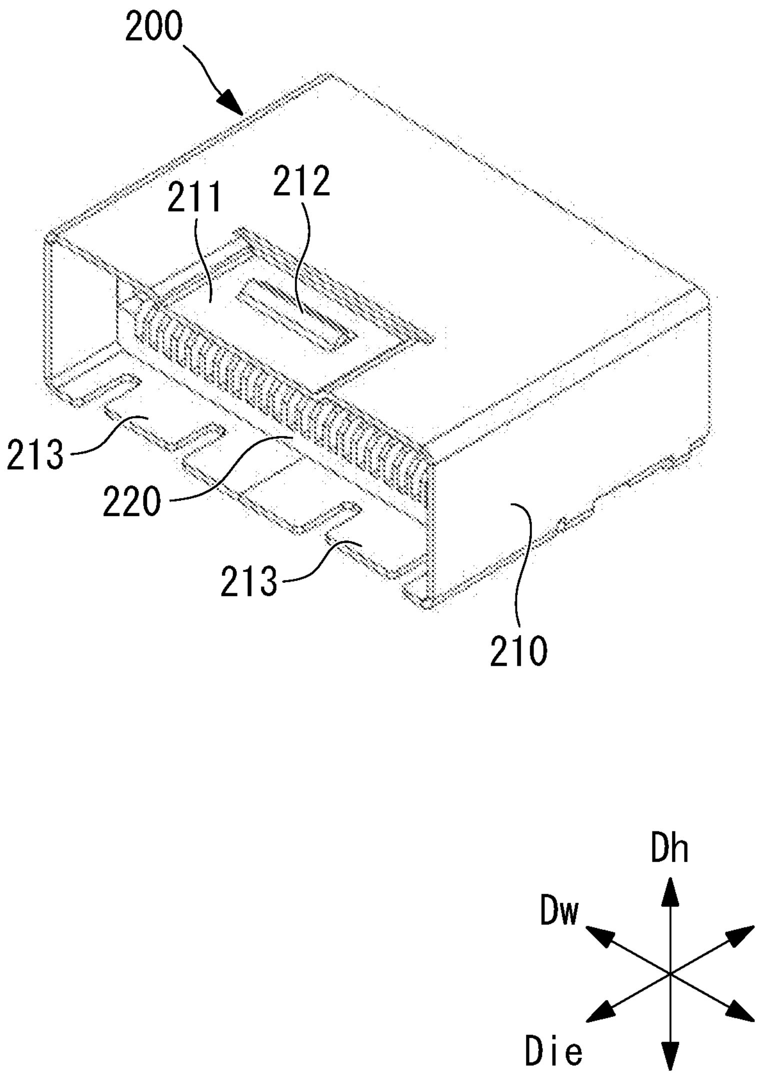
FIG. 19 is a perspective view of the receptacle connector.
Figure 20:
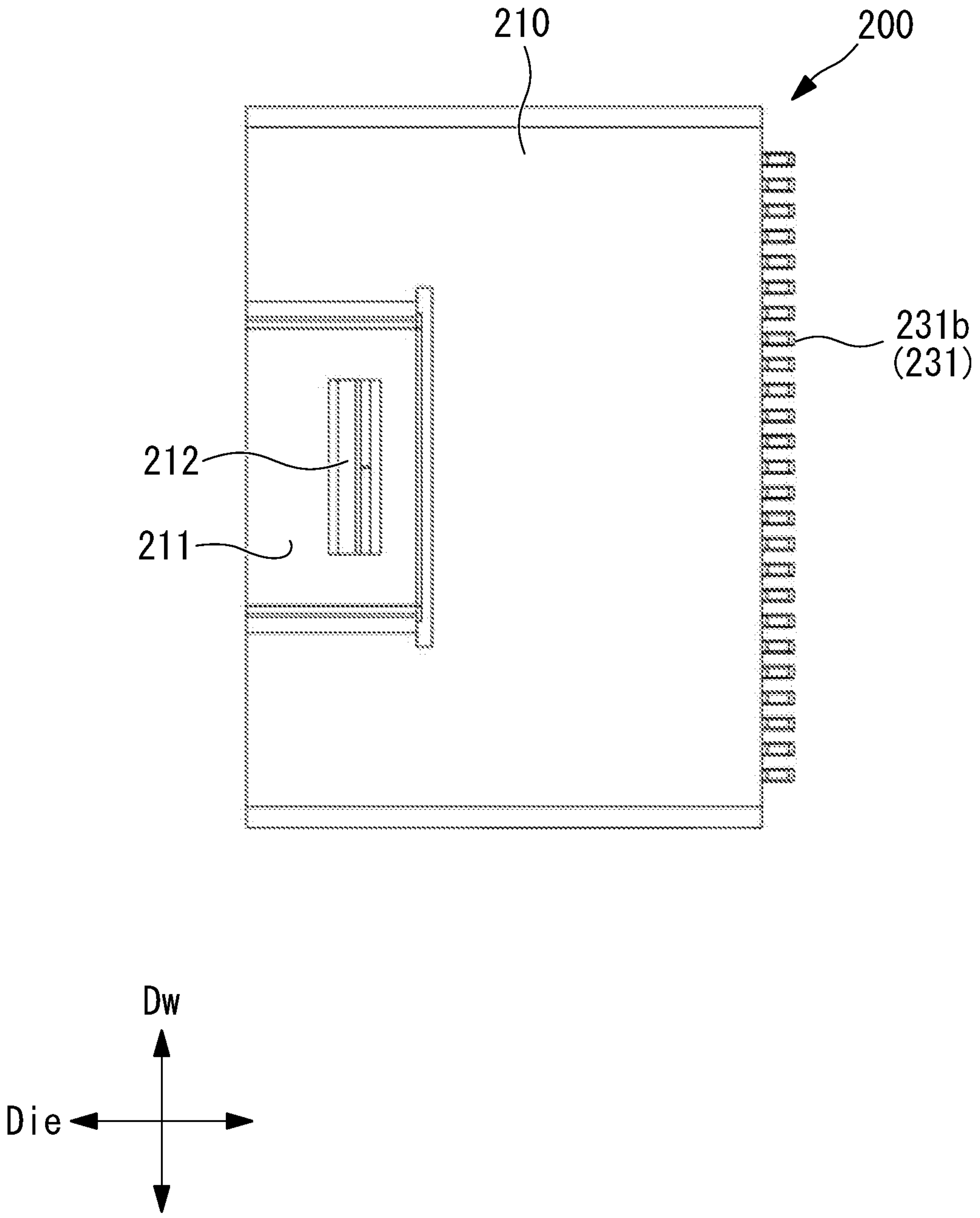
FIG. 20 is a plan view of the receptacle connector.
Figure 21:
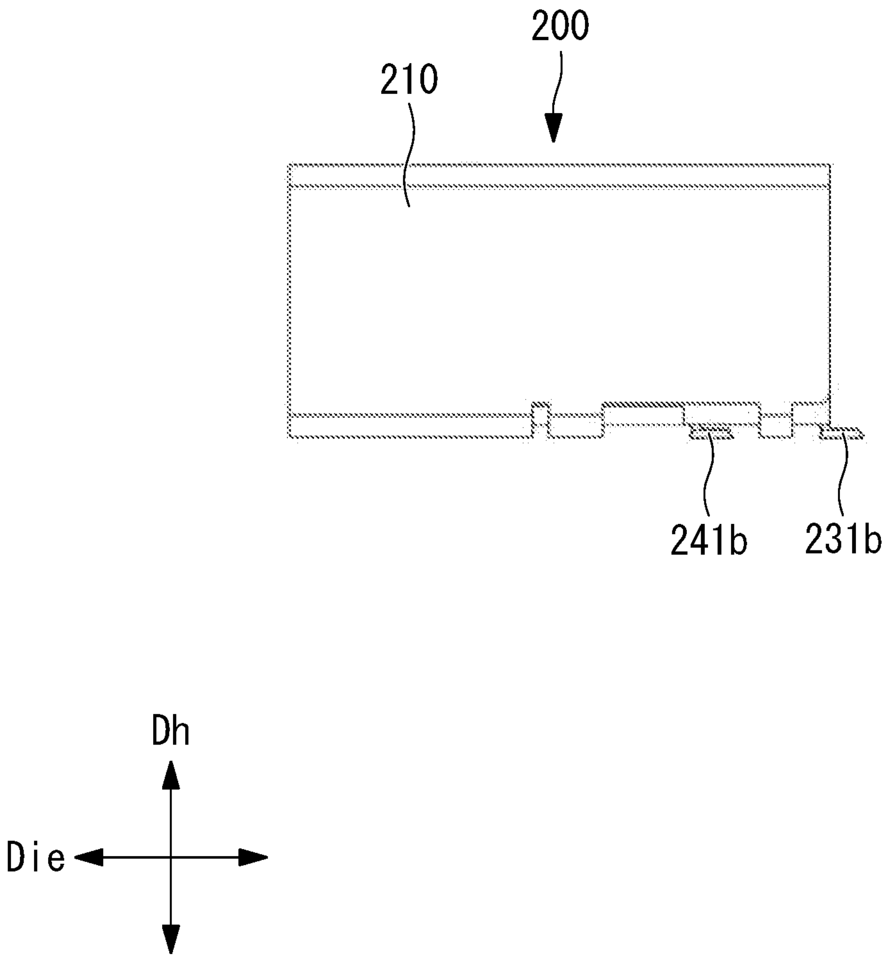
FIG. 21 is a side view of the receptacle connector.

As illustrated in FIG. 19 and FIG. 20, a protrusion as the engaged part 212 is provided in the center region of the recessed part 211.

As illustrated in FIG. 11 and FIG. 19, for example, a part of the bottom face of the recessed part 211 is cut and erected upward, and thereby the protrusion as the engaged part 212 is formed.

For example, the protruding dimension of the protrusion is a dimension so as not to protrude from the upper face of the shell 210 (except for a region where the recessed part 211 is formed). Thus, the protruding dimension of the protrusion is set to be substantially equal to or smaller than the depth dimension of the recessed part 211.

The front side (the side on which the plug connector 100 is located) of the cut and erected protrusion forms a curved face smoothly connected to the bottom face of the recessed part 211. Thus, when the plug connector 100 is inserted in the receptacle connector 200, the tip 141*f* of the lever member 141 will move upward along the curved face of the protrusion and then pass over the protrusion. Once the hole as the engaging part 141*a* reaches the protrusion as the engaged part 212, the engaging part 141*a* is lowered by the elastic force of the leaf spring 143 and engaged with the protrusion.

On the other hand, the rear end of the protrusion is separated from the bottom face of the recessed part 211 and formed as a stopper. Thus, in the direction of extracting the plug connector 100 from the receptacle connector 200, the hole as the engaging part 141*a* is caught in the protrusion as the engaged part 212, and this prevents the plug connector 100 from being extracted.

As illustrated in FIG. 22, the fixing tab 213 is provided on the underside of the shell 210.

The fixing tab 213 is a portion to make the length of a lower edge 215*b* longer than that of a simple straight edge, the lower edge 215*b* forming the opening 215 in which the plug connector 100 is inserted. Accordingly, the area of a portion where solder is absorbed upward to form a filet can be larger than that of a simple straight edge.

In the case of FIG. 22, the fixing tab 213 has a tongue-like shape whose periphery is cut out in a U-shape. The U-shaped cutout corresponds to the shape of the fixing pad 11*b* of the substrate 11 illustrated in FIG. 3.

With the fixing tabs 213 being provided, the area of a portion where solder is absorbed upward to form a filet is increased, and the shell 210 can be more firmly mounted on the substrate 11.

Figure 23:
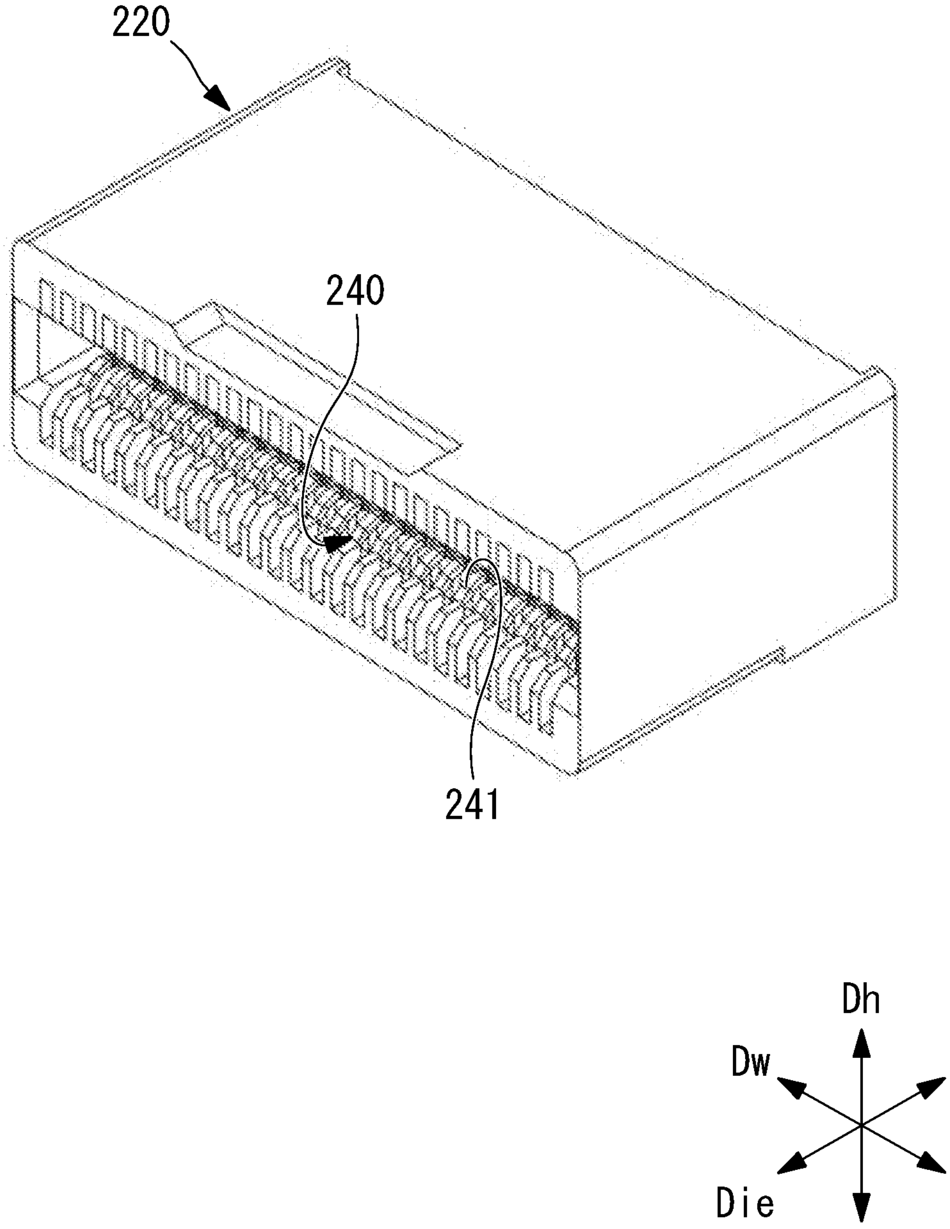
FIG. 23 is a perspective view of a housing.

As illustrated in FIG. 23, the housing 220 is a member that holds the contact pin group 230 having a plurality of contact pins 231 and a contact pin group 240 having a plurality of contact pins 241.

The housing 220 is formed of an insulating material.

In the housing 220, a plurality of partition plates that partition the contact pins 231 from each other or the contact pins 241 from each other and a space (a slot) in which the plug substrate 130 is inserted are formed.

Figure 24:
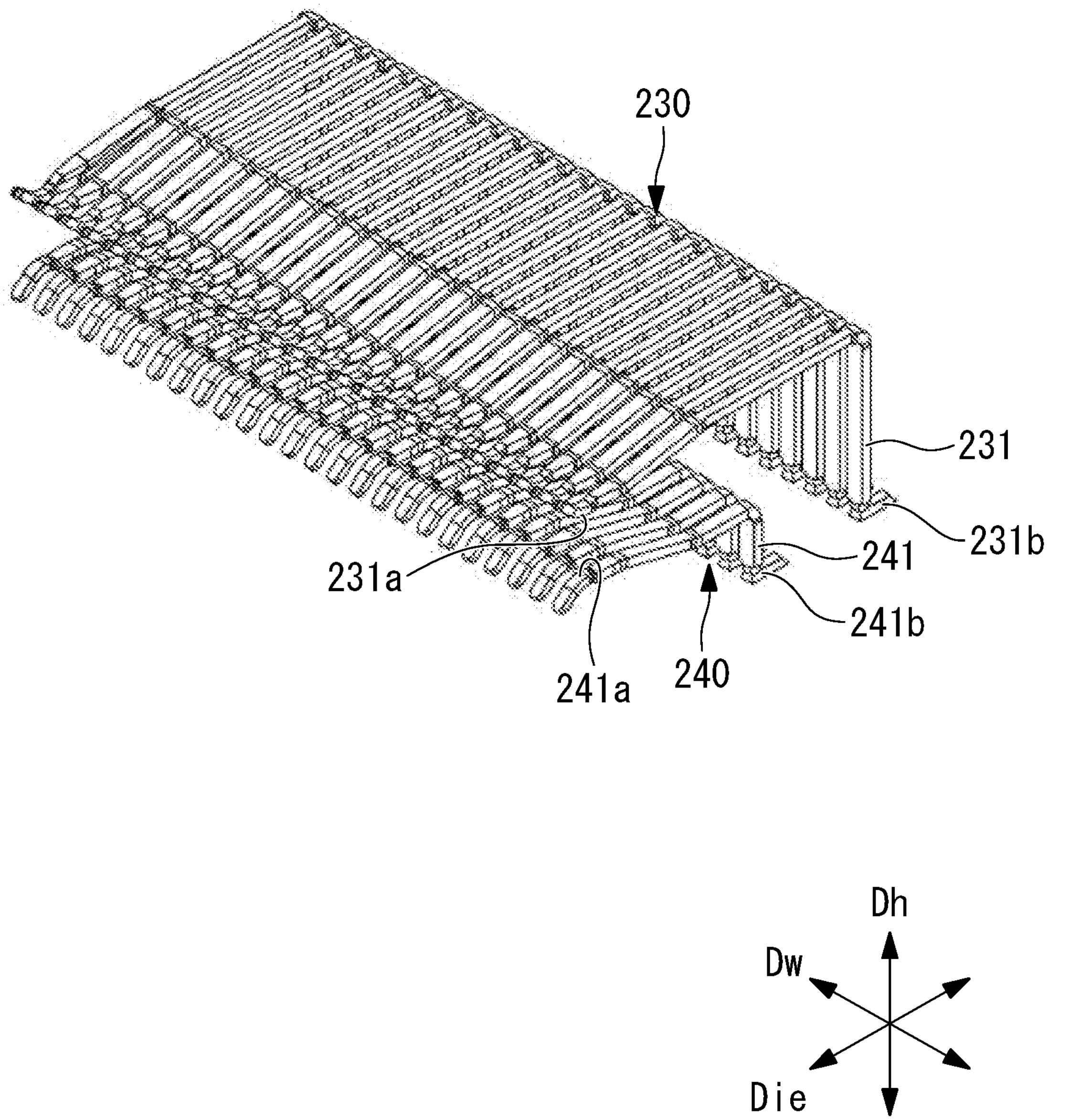
FIG. 24 is a perspective view of a contact pin group.

As illustrated in FIG. 24, the contact pin group 230 has multiple types of contact pins 231 for different applications.

Each contact pin 231 is a thin, crooked metal component, and the contact pins 231 are aligned in the width direction Dw orthogonal to the insertion-extraction direction Die.

For each contact pin 231, a portion on the base side (a mount part 231*b*) is mounted on the electrode pad 11*a* of the substrate 11, and a portion on the tip side (a contact part 231*a*) bent inward in a convex shape comes into contact with the electrode pad 131 of the plug substrate 130. Note that each mount part 231*b* is mounted on a corresponding electrode pad 11*a* by soldering, for example.

The contact pin group 240 is a group paired with the contact pin group 230 and has multiple types of contact pins 241 for different applications.

Each contact pin 241 is a thin, crooked metal component, and the contact pins 241 are aligned in the width direction Dw orthogonal to the insertion-extraction direction Die.

For each contact pin 241, a portion on the base side (a mount part 241*b*) is mounted on the electrode pad 11*a* of the substrate 11, and a portion on the tip side (a contact part 241*a*) bent inward in a convex shape comes into contact with the electrode pad 131 of the plug substrate 130. Note that each mount part 231*b* is mounted on a corresponding electrode pad 11*a* by soldering, for example.

In a state where the contact pin group 230 and the contact pin group 240 are aligned, the contact part 231*a* of each contact pin 231 faces the contact part 241*a* of each contact pin 241 in the height direction Dh (the direction orthogonal to both the insertion-extraction direction Die and the width direction Dw). Further, the mount parts 231*b* of respective contact pins 231 are arranged in the same plane as the mount parts 241*b* of respective contact pins 241.

In mounting of the receptacle connector 200 configured as described above, the mount parts 231*b* of respective contact pins 231 and the mount parts 241*b* of respective contact pins 241 are mounted on the electrode pads 11*a* of the substrate 11 by soldering as illustrated in FIG. 11, and the fixing tabs 213 of the shell 210 are mounted on the fixing pads 11*b* of the substrate 11 by soldering as illustrated in FIG. 22.

[Method of Inserting Plug Connector]

Figure 25:
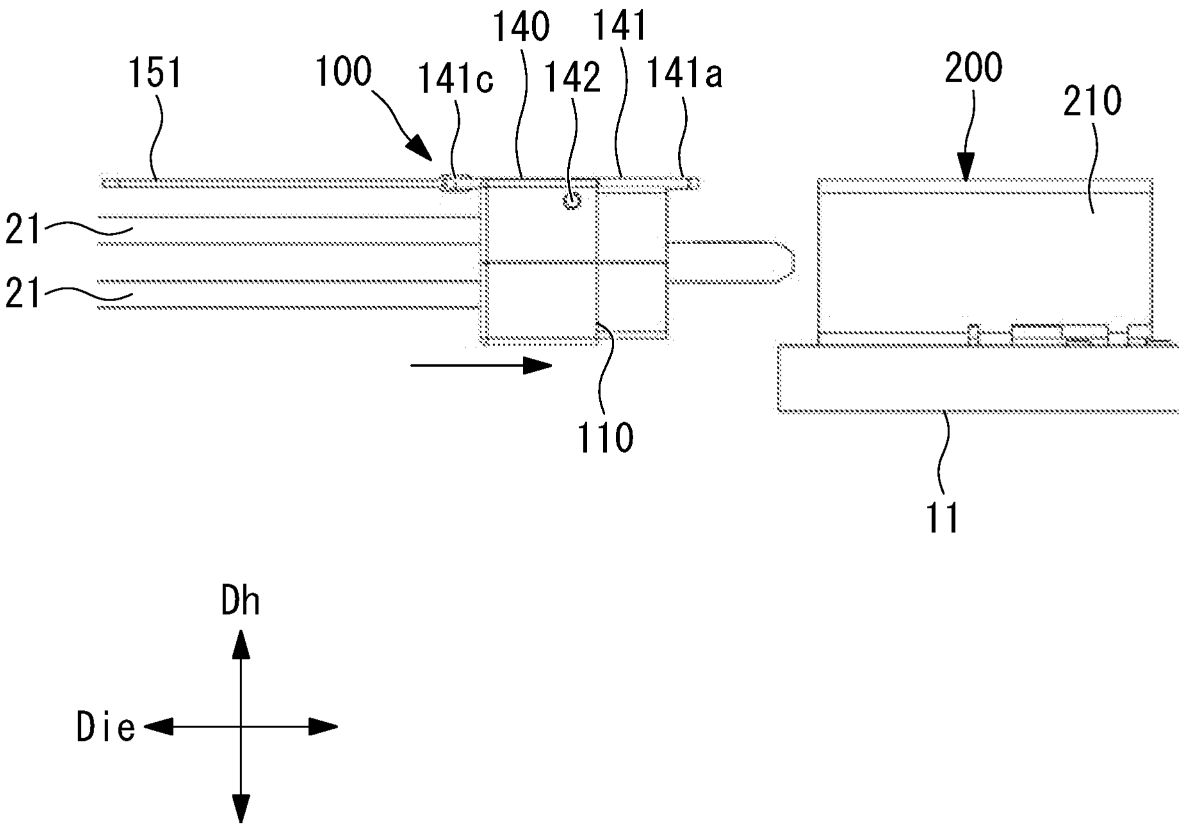
FIG. 25 is a side view illustrating a view when the plug connector is being inserted in the receptacle connector.
Figure 26:
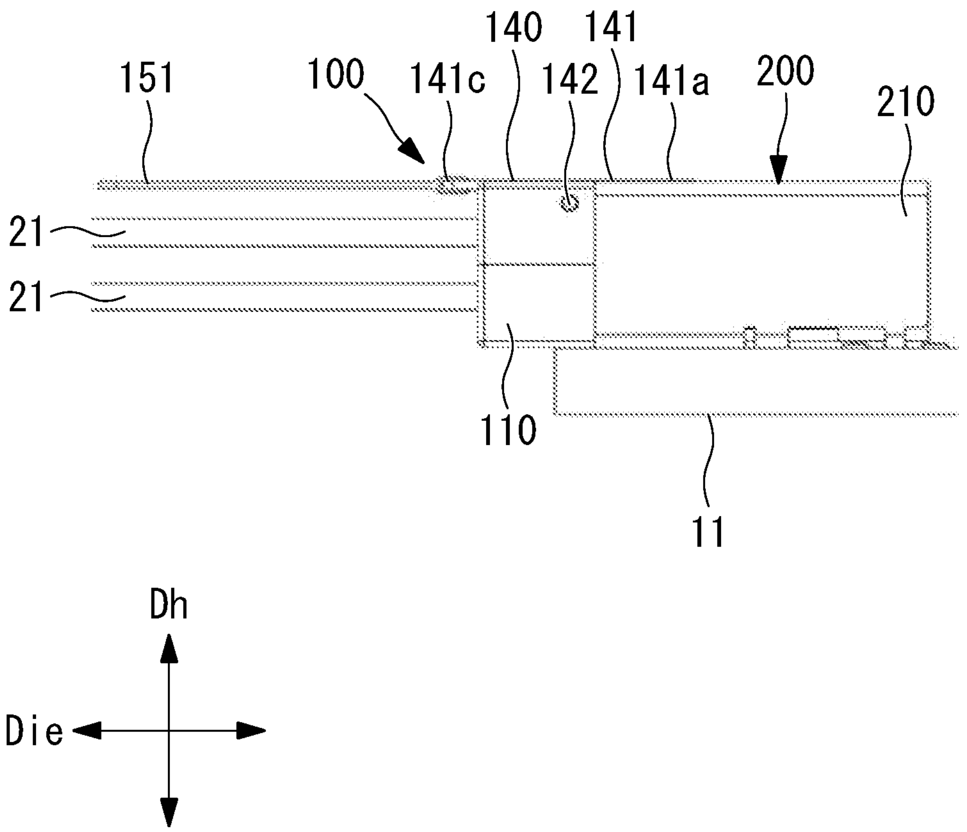
FIG. 26 is a side view illustrating a view when the plug connector has been inserted in the receptacle connector (in an unloaded state).

As illustrated in FIG. 25 and FIG. 26, the plug connector 100 is inserted in the insertion-extraction direction Die in the receptacle connector 200 mounted on the substrate 11.

As described above, the lever member 141 automatically passes over the protrusion in the inserting direction, and thus no particular operation of the lever member 141 is required.

As illustrated in FIG. 11, the step of the casing 110 (the step between the tip-side portion 111 and the base portion 112) of the plug connector 100 abuts against the end of the shell 210 of the receptacle connector 200, and the hole as the engaging part 141*a* engages with the protrusion as the engaged part 212. Thus, the plug connector 100 is positioned and locked to the receptacle connector 200.

[Method of Extracting Plug Connector]

Figure 27:
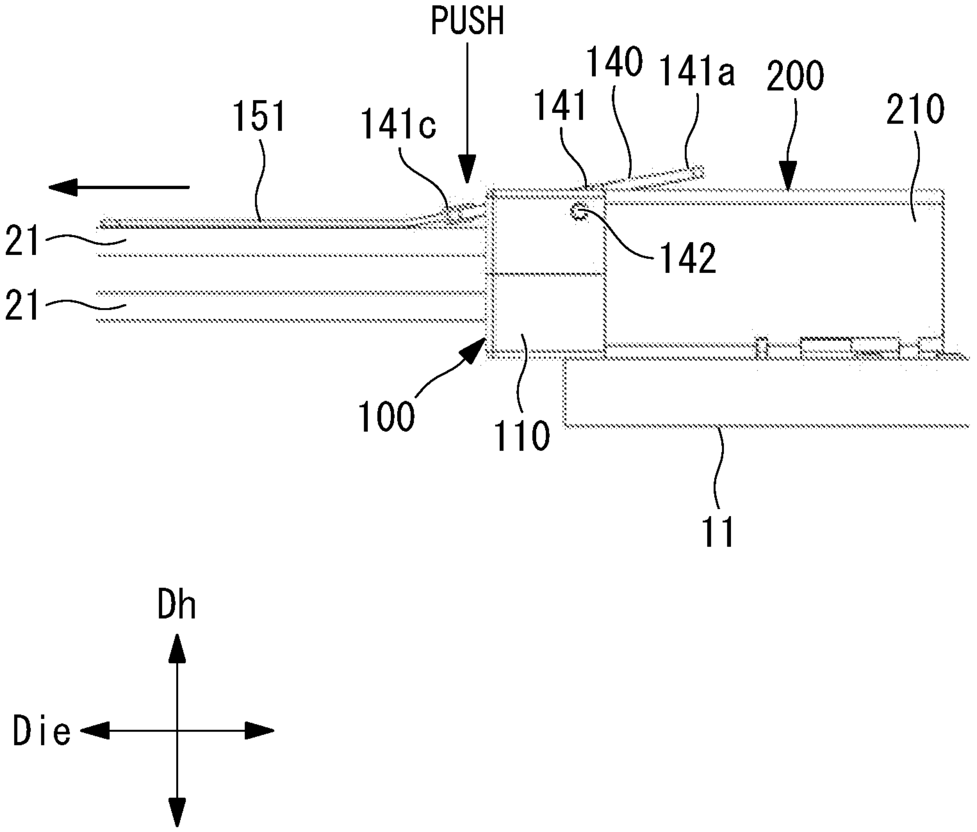
FIG. 27 is a side view illustrating a view when the plug connector has been inserted in the receptacle connector (in a state with the operating part pressed).
Figure 28:
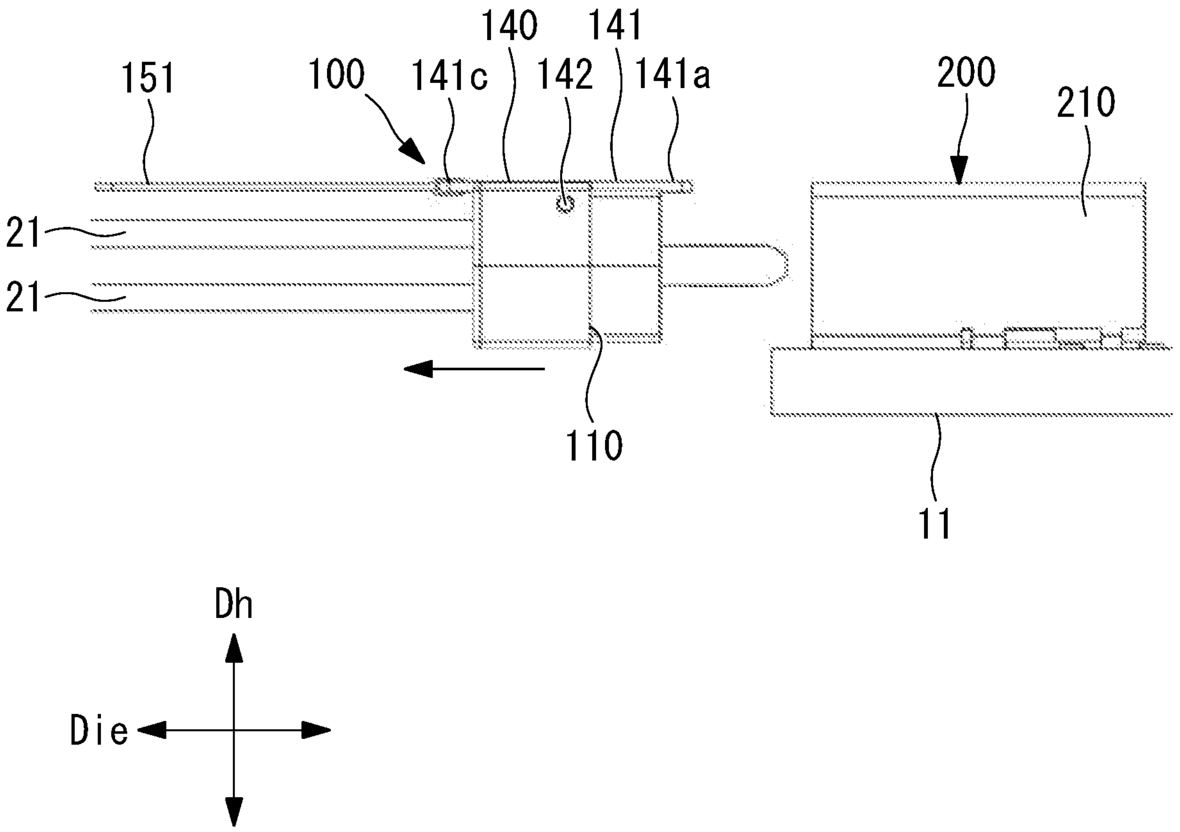
FIG. 28 is a side view illustrating a view when the plug connector is being extracted from the receptacle connector.

As illustrated in FIG. 27 and FIG. 28, the operating part 141*c* of the lever member 141 is pressed to lift the engaging part 141*a* and release (unlock) the engagement between the engaging part 141*a* and the engaged part 212.

Next, in a state where the operating part 141*c* is pressed, the tab 151 connected to the operating part 141*c* is pulled along the insertion-extraction direction Die. Accordingly, the plug connector 100 is extracted from the receptacle connector 200.

Note that the tab 151 is not essential, and a portion other than the tab 151 (for example, the operating part 141*c* or the casing 110) may be gripped and pulled.

According to the present embodiment, the following advantageous effects are achieved.

[Plug Connector]

The lever member 141 has the fulcrum part 141*b* supported pivotably relative to the casing 110, the engaging part 141*a* that is located closer to the receptacle connector 200 than the fulcrum part 141*b* in the insertion-extraction direction Die and that can engage with the engaged part 212 of the receptacle connector 200, and the operating part 141*c* that is located on the opposite side from the receptacle connector 200 with respect to the fulcrum part 141*b* in the insertion-extraction direction Die and that, when pressed, can release the engaging part 141*a* from engagement with the engaged part 212. Therefore, the operating part 141*c* used for releasing engagement can be located on the opposite side from the receptacle connector 200 with respect to the fulcrum part 141*b*.

There is not provided, for example, the integrated circuit 12 or the heatsink 13 for cooling the integrated circuit 12 on the opposite side from the receptacle connector 200 with respect to the fulcrum part 141*b*, and an enough space is available. Thus, the operating part 141*c* can be pressed in a wide space, and the engaging part 141*a* can be easily released from engagement with the engaged part 212. This enables easy extraction of the plug connector 100 that has been secured in the receptacle connector 200.

Further, since the engaging part 141*a*, the fulcrum part 141*b*, and the operating part 141*c* are provided on a single member (the lever member 141), a reliable mechanism with a simple configuration can be provided.

Further, since the operating part 141*c* is located outside the casing 110 in the insertion-extraction direction Die, the operating part 141*c* can be pressed at a position that does not interfere with the casing 10 as well as the integrated circuit 12 or the heatsink 13 for cooling the integrated circuit 12.

Further, the engaging part 141*a* and the operating part 141*c* of the lever member 141 are arranged in substantially the same plane. This can ensure a wide space above the lever member 141 and can avoid interference of the lever member 141 with a component located above the lever member 141, for example. As a result, it is possible to contribute to higher-density mounting of the communication system.

[Receptacle Connector]

The shell 210 has the recessed part 211 that the lever member 141 enters, and the engaged part 212 is formed in the recessed part 211. Therefore, even in a state where the engaging part 141*a* is in engagement with the engaged part 212, the shell 210 can be designed such that the lever member 141 enters the recessed part 211 and the lever member 141 does not protrude from the face of the shell 210. Accordingly, a wide space above the lever member 141 and the shell 210 can be ensured.

Further, the recessed part 211 has the depth dimension such that the lever member 141 is substantially flush with the face of the shell 210 in a state where the engaging part 141*a* is in engagement with the engaged part 212 and the lever member 141 is inside the recessed part, and thus the lever member 141 does not protrude from the face of the shell 210. Accordingly, a wide space above the lever member 141 and the shell 210 can be ensured.

Further, the protrusion as the engaged part 212 has a protruding dimension that is substantially equal to or smaller than the depth dimension of the recessed part 211. This can prevent the protrusion from protruding from the face of the shell 210.

[Method of Extraction]

The plug connector 100 is extracted from the receptacle connector 200 by pulling the lever member 141 or the tab 151 attached near the operating part 141*c* of the lever member 141 while pressing the operating part 141*c* of the lever member 141, and it is thus possible to easily extract the plug connector 100 from the receptacle connector 200.

<Modified Example of Lock Mechanism>

The lock mechanism 140 is not limited to the configuration described above as long as it is configured such that the lever member 141 is pivoted about the fulcrum part 141*b* while being pushed.

For example, the engaging part 141*a* of the lever member 141 may be a protrusion. In such a case, the engaged part 212 is a hole or a recess that fits to the shape of the engaging part 141*a*.

Further, the leaf spring 143 is not necessarily required to be employed as long as the alternative can apply elastic force. For example, an elastic body such as a coil spring or a rubber may be employed, or a spring part may be integrally provided on the lever member 141. Further, the member that applies elastic force may be omitted, and instead a configuration in which the engaging part 141*a* is automatically lowered due to a positional relationship with the center of gravity thereof may be employed.

Further, the fulcrum of the lever member 141 is not necessarily required to be formed of a hole as the fulcrum part 141*b* and the shaft 142.

<Modified Example of Fixing Tab>

The fixing tab 213 is not limited to the shape described above as long as it is shaped such that the length of the lower edge can be longer than that of a simple straight edge, the lower edge delimiting the opening in which the plug connector 100 is inserted.

Note that, obviously, the shape of the fixing pad 11*b* of the substrate 11 can be changed in accordance with the shape of the fixing tab 213.

What is claimed is:

1. A plug connector inserted in and extracted from a receptacle connector, the plug connector comprising:
- a casing; and
- a lever member attached to the casing, wherein the lever member comprises:
  - a fulcrum part supported pivotably relative to the casing,
  - an engaging part located closer to the receptacle connector than the fulcrum part in an insertion-extraction direction and configured to engage with an engaged part of the receptacle connector,
  - an operating part located on an opposite side from the receptacle connector with respect to the fulcrum part in the insertion-extraction direction and configured to, when depressed, release the engaging part from engagement with the engaged part, and
  - a flat plate-like portion along the insertion-extraction direction,
  - wherein the engaging part and the operating part are provided in the flat plate-like portion in a substantially same plane.

2. The plug connector according to claim 1, wherein the operating part is located outside the casing in the insertion-extraction direction.

3. The plug connector according to claim 1, wherein the engaging part is a hole or a recess that fits to a shape of the engaged part formed as a protrusion.

4. The plug connector according to claim 1, wherein the engaging part is a protrusion that fits to a shape of the engaged part formed as a hole or a recess.

5. A receptacle connector to which the plug connector according to claim 1 is connected, the receptacle connector comprising a shell, wherein the shell has a recessed part that the lever member enters, and wherein the engaged part is formed within the recessed part.

6. The receptacle connector according to claim 5, wherein in a state where the engaging part is in engagement with the engaged part and the lever member is inside the recessed part, the recessed part has a depth dimension such that the lever member is substantially flush with a face of the shell.

7. The receptacle connector according to claim 5, wherein the engaged part is a protrusion that fits to a shape of the engaging part formed as a hole or a recess.

8. The receptacle connector according to claim 7, wherein the protrusion as the engaged part has a protruding dimension that is substantially equal to or smaller than the depth dimension of the recessed part.

9. The receptacle connector according to claim 5, wherein the engaged part is a hole or a recess that fits to a shape of the engaging part formed as a protrusion.

10. A method of extracting the plug connector according to claim 1 from the receptacle connector, the method comprising:

pulling the lever member or a tab attached near the operating part of the lever member while pressing the operating part of the lever member to extract the plug connector from the receptacle connector.

* * * * *